United States Patent [19]
Watts, III

[11] Patent Number: 6,052,520
[45] Date of Patent: Apr. 18, 2000

[54] PROCESS FOR PREDICTING BEHAVIOR OF A SUBTERRANEAN FORMATION

[75] Inventor: James W. Watts, III, Houston, Tex.

[73] Assignee: Exxon Production Research Company, Houston, Tex.

[21] Appl. No.: 09/245,983

[22] Filed: Feb. 5, 1999

Related U.S. Application Data

[60] Provisional application No. 60/074,188, Feb. 10, 1998.

[51] Int. Cl.⁷ .......................... G06F 19/00; G06T 17/50; G01V 1/00
[52] U.S. Cl. ..................... 395/500.31; 702/13; 73/149; 395/500.23
[58] Field of Search ................... 395/500.31, 500.23; 702/2, 7, 12, 13, 16; 73/149, 152.11; 345/420, 423; 374/136; 367/73; 250/253; 436/25; 706/929

[56] References Cited

U.S. PATENT DOCUMENTS

| | | | |
|---|---|---|---|
| 4,918,643 | 4/1990 | Wong | 395/500.25 |
| 4,969,116 | 11/1990 | Wada et al. | 395/500.06 |
| 4,991,095 | 2/1991 | Swanson | 702/16 |
| 5,058,012 | 10/1991 | Hinchman et al. | 702/12 |
| 5,305,209 | 4/1994 | Stein et al. | 702/13 |
| 5,321,612 | 6/1994 | Stewart | 702/13 |
| 5,629,845 | 5/1997 | Liniger | 364/172 |
| 5,710,726 | 1/1998 | Rowney et al. | 395/500.31 |
| 5,764,515 | 6/1998 | Guerillot et al. | 702/2 |
| 5,835,882 | 11/1998 | Vienot et al. | 702/7 |
| 5,835,883 | 11/1998 | Neff et al. | 702/7 |
| 5,838,634 | 11/1998 | Jones et al. | 367/73 |
| 5,844,564 | 12/1998 | Bennis et al. | 345/423 |

OTHER PUBLICATIONS

Byer, Thomas J.; Edwards, Michael G.; and Aziz, Khalid. "*A Preconditioned Adaptive Implicit Method for Reservoirs with Surface Facilities,*" 1999 Society of Petroleum Engineers Reservoir Simulaton Symposium, Houston, Texas (Feb. 14–17, 1999) Paper No. SPE 51895, pp. 173–181.

Rodriquez, Fernando; Galindo–Nava, Agustin; and Guzman, Javier. "*A General Formulation for Compositional Reservoir Simulation,*" 1994 Society of Petroleum Engineers International petroleum Conference & Exhibition of Mexico, Vera Cruz, Mexico (Oct. 10–13, 1994) Paper No. SPE 28705, pp. 377–390.

(List continued on next page.)

*Primary Examiner*—Kevin J. Teska
*Assistant Examiner*—Russell W. Frejd
*Attorney, Agent, or Firm*—Gary D. Lawson

[57] ABSTRACT

A method is disclosed of predicting a characteristic of a fluid-containing physical system such as a reservoir. The physical system is discretized to a plurality of gridcells. For each gridcell, nonlinear governing equations are constructed that are representative of fluid properties for each fluid. The nonlinear terms are linearized to derive linear equations at a current timestep. The linear equations are then solved to determine estimates of the solution. The estimated solution is then improved by a gridcell-by-gridcell computation wherein flows into and out of a particular gridcell are determined using linearized values of nonlinear terms in gridcells adjacent that particular gridcell. The improved solution is used to predict a property of a fluid in the physical system at end of the timestep. These calculation steps are repeated for a plurality of timesteps and the results are used to predict a property of the physical system and the fluids it contains as a function of time.

17 Claims, 7 Drawing Sheets

OTHER PUBLICATIONS

Heinemann, Zoltan E. and Brand, Clemens W. *"Gridding Techniques in Reservoir Simulation,"* proceedings, First and Second International Forum on Reservoir Simulation, Alpbach, Austria (Sep. 12–16, 1988 and Sep. 4–8, 1989) pp. 339–425.

Appleyard, J.R. and Cheshire, I.M. *"Reservoir Modelling: Fully Implicit Simulation Methods,"* Developments in Petroleum Engineering, Elsevier Develop Ser. No. 1. (Book: ISBN 0–85334–358–6), Elsevier Science Publishing Co., New York (1985) pp. 229–263.

Watts III, James W. *"A Conjugate Gradient–Truncated Direct Method for the Iterative Solution of the Reservoir Simulation Pressure Equation,"* 54th Annual Fall Technical Conference and Exhibition of the Society of Petroleum Engineers of AIME, Las Vegas, Nevada (Sep. 23–26, 1979), Paper No. SPE 8252, pp. 1–8.

Watts, J. W. *"An Iterative Matrix Solution Method Suitable for Anistropic Problems,"* Society of Petroleum Engineers Journal, vol. 11, (Mar. 1971) pp. 47–51.

Appleyard, J.R.; Cheshire, I. M.; and Pollard, R. K. *"Special Techniques for Fully–Implicit Simulators,"* Procedures European Symposium on Enhanced Oil Recovery, Bournemouth, England (1981) pp. 395–408.

Appleyard, John R. and Cheshire, Ian M. *"The Cascade Method for Accelerated Convergence in Implicit Simulators,"* European Petroleum Conference, London, England (Oct. 25–28, 1982) Paper No. EUR 283, pp. 113–121.

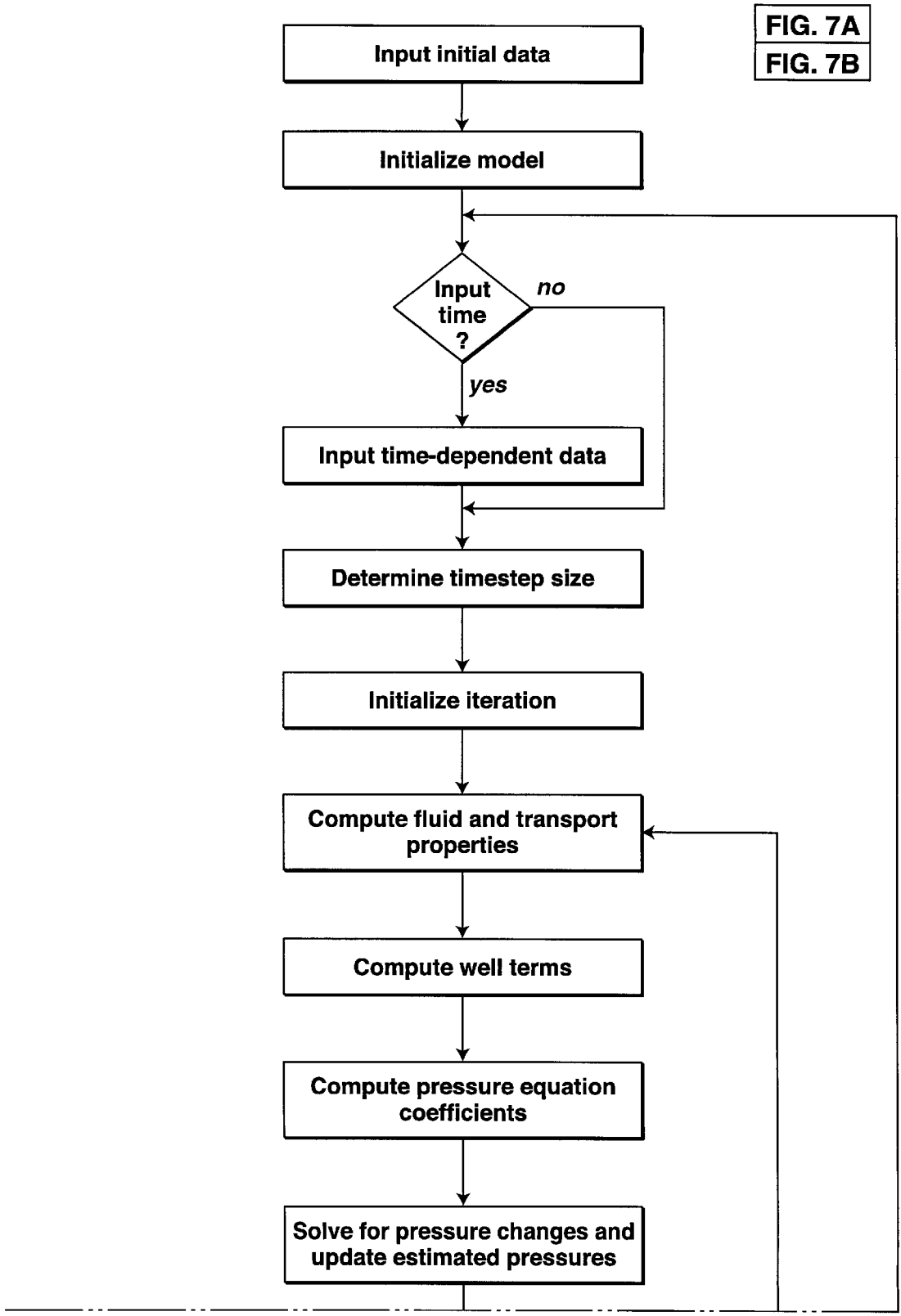

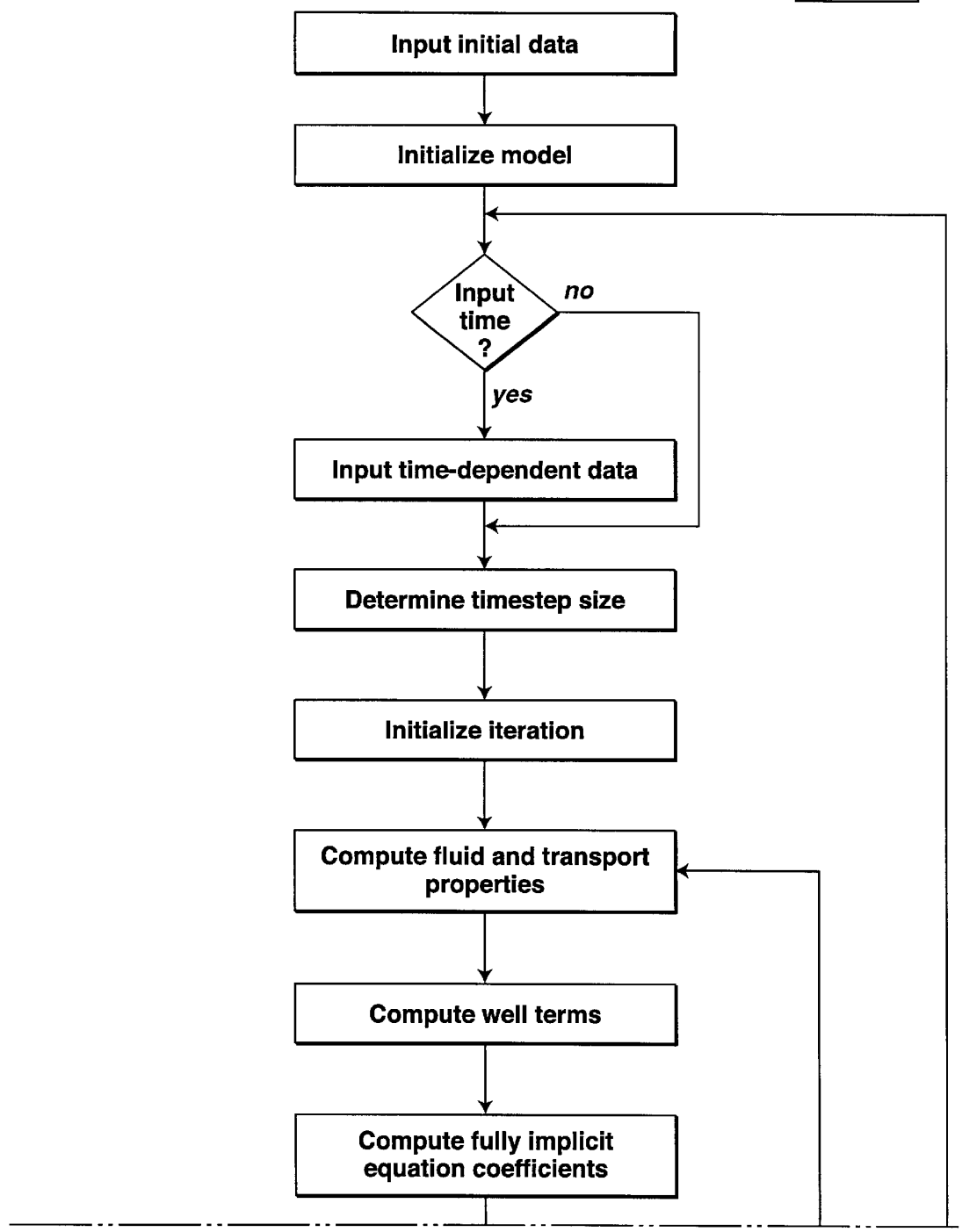

PROCESS FOR PREDICTING BEHAVIOR OF A SUBTERRANEAN FORMATION

This application claims the benefit of United States Provisional Application Ser. No. 60/074,188 filed Feb. 10, 1998.

FIELD OF THE INVENTION

The invention relates generally to exploitation and development of hydrocarbons in an underground reservoir and, more particularly, to an improved process for predicting the behavior of a subterranean, hydrocarbon-bearing formation.

BACKGROUND OF THE INVENTION

Reservoir simulation is a process of inferring the behavior of a real reservoir from the performance of a model of that reservoir. Because mass transfer and fluid flow processes in petroleum reservoirs are so complex, reservoir simulations can only be done using computers. Computer programs that perform calculations to simulate reservoirs are called reservoir simulators. The objective of reservoir simulation is to understand the complex chemical, physical, and fluid flow processes occurring in a petroleum reservoir sufficiently well to be able to predict future behavior of a reservoir and to maximize recovery of hydrocarbons. The reservoir simulator can solve reservoir problems that are not solvable in any other way. For example, a reservoir simulator can predict the consequences of reservoir management decisions. Reservoir simulation often refers to the hydrodynamics of flow within a reservoir, but in a larger sense it also refers to the total petroleum system which includes the reservoir, the surface facilities, and any interrelated significant activity.

FIG. 1 illustrates schematically four basic steps in conventional reservoir simulation of a petroleum reservoir. The first step (step 1 in FIG. 1) is to construct a mathematical model of a real reservoir based on the chemical, physical, and fluid flow processes occurring in the reservoir. The mathematical model will comprise a set of nonlinear partial differential equations. The second step (step 2 in FIG. 1) involves discretization of the reservoir in both time and space. Space is discretized by dividing the reservoir into suitable cells with each cell having a set of nonlinear finite difference equations. The third step (step 3 in FIG. 1) is to linearize the nonlinear terms that appear in the nonlinear finite difference equations and, based on this linearization, construct linear algebraic equations. The fourth step (step 4 in FIG. 1) is to solve the linear algebraic equations. The solution provides a prediction of reservoir behavior, which enables a petroleum engineer to predict reservoir performance, including the rate at which the reservoir can be produced. The accuracy of the model can be checked against the history of the reservoir after the model has been subjected to a simulated recovery process.

In developing a mathematical model (step 1 in FIG. 1), the following principles apply:

(1) Anything that enters or leaves the reservoir must cross a boundary.

(2) At some initial time the reservoir can be described by some set of conditions.

(3) The processes that occur within the reservoir obey known physical laws and consequently can be described by a set of conditions.

From these principles, a complete mathematical model of the reservoir can be developed which is a combination of (i) boundary conditions, (ii) initial conditions to describe conditions at zero time, and (iii) a system of equations that govern the behavior of the fluids in the reservoir. The governing equations are obtained by combining the following physical principles:

(1) conservation of mass, (2) conservation of momentum, (3) conservation of energy (first law of thermodynamics), and (4) thermodynamic equilibrium.

The resulting equations are nonlinear partial differential equations that describe the unsteady-state flow of all fluids throughout the reservoir and relate the pressure and saturation changes of the fluids with time throughout the reservoir. Examples of methods for constructing mathematical models of reservoirs are described in the following books: Peaceman, D. W., *Fundamentals of Numerical Reservoir Simulation,* Elsevier Scientific Publishing Company, Amsterdam, (1977); and Mattax, C. C. and Dalton, R. L., *Reservoir Simulation,* Monograph Volume 13, Society of Petroleum Engineers (1990).

Solution of the mathematical model requires determining values of the independent parameters that satisfy all the governing equations and boundary conditions. In general, there are two solution choices: analytical or numerical methods. Analytical methods are not used because the equations are highly nonlinear and are practically impossible to solve by today's methods. The most common method for solving the equations uses a discretization process.

The second step of conventional reservoir simulation (step 2 in FIG. 1) involves subdivision of distance and time into definite, specified increments. This discretization process transforms the continuous partial differential equations to a finite dimensional system of algebraic equations (commonly called finite difference equations). Space is discretized by subdividing the reservoir volume into contiguous cells conforming to a predetermined grid pattern, frequently called "gridblocks" or "gridcells." A typical reservoir model can have thousands of cells. These cells will have sides with lengths ranging from a few meters to a few hundred meters.

The life of a reservoir is discretized (or divided) into time increments. A simulator computes changes in each gridcell (flow, pressure, etc.) over each of many timesteps. Typically, conditions are defined only at the beginning and end of a timestep, and nothing is defined at any intermediate time within a timestep. Consequently, conditions within each gridcell may change abruptly from one timestep to the next. Usually, timesteps are chosen to be small enough to limit sizes of these abrupt changes to acceptable limits. The size of the timesteps depends on accuracy considerations and stability constraints; generally the smaller the timestep the more accurate the solution, but smaller timesteps require more computational work.

Although discretization of the reservoir is an abstraction, it is qualitatively correct to visualize gridcells as well-stirred tanks with permeable sides. The contents of a gridcell are considered uniformly distributed within the cell and the rates at which fluids flow in or out are determined by the permeabilities of the sides of the cell and the pressure differences between adjacent gridcells. In essence, the mathematical problem is reduced to a calculation of flow between adjacent gridcells.

Because of the discretization process, discontinuities in saturation and pressure exist at interfaces between gridcells. Similarly, saturation and pressure are also discontinuous in time, with the reservoir condition defined only at the end of each timestep. Properties that are functions of saturation (such as relative permeability and capillary pressure) can change significantly over a timestep. In the real reservoir, at any particular time, a gridcell has only a single value of each phase saturation and any property that is saturation dependent. To represent variations in reservoir properties, the properties of the gridcells must differ from cell to cell. The abruptness with which a property changes between neighboring cells is largely a function of gridcell size. During a timestep, the saturation-dependent properties will also have assumed many values. However, in reservoir simulation a single value for each saturation-dependent variable must be used to describe conditions over the entire timestep. It is therefore apparent that the finite difference equations can only approximate the partial differential equations that hold for any point within the grid system at a predetermined timestep.

The third step in conventional reservoir simulation (step 3 in FIG. 1) is to linearize the nonlinear terms that appear in the nonlinear finite difference equations and, based on this linearization, construct a linear set of algebraic equations. A linearization represents a term as a straight line function of the quantity or quantities upon which it depends.

The fourth step in conventional reservoir simulation (step 4 in FIG. 1) is to solve the algebraic equations. It is necessary to solve the equations for the unknown values, which in a reservoir containing oil and water will normally include two of the following four variables: oil pressure, water pressure, oil saturation, and water saturation. Other quantities can be derived from these variables, such as oil production rate and water production rate.

Many simulation methods have been proposed. The method chosen can affect the stability and accuracy of the solution and some methods require more computational work than other methods on a per-timestep basis. The methods differ primarily on how they treat the way the reservoir variables (such as pressure and saturation) vary in time. Most methods involve variations of the following two procedures:

(1) Explicit procedures use mobilities and capillary pressures computed as functions of saturations at the beginning of a timestep. The saturations are known from the previous timestep calculations. The mobilities and capillary pressures are assumed to maintain the same values during a timestep that they had at the beginning of the timestep.

(2) Implicit procedures use mobility and capillary pressure calculated as functions of saturation at the end of the timestep. The values are not known until calculations for the timestep have been completed. As a result, they must be determined using an iterative process.

A brief overview of six basic methods for solving finite difference equations is given below. These are the Fully Explicit method, the Implicit Pressure Explicit Saturation method (IMPES), the Fully Implicit method, the Sequential Implicit method (SEQ), the Adaptive Implicit method (AIM), and the Cascade method.

Fully Explicit Method

The Fully Explicit method is the simplest solution method because for the purposes of computing flow between cells it assumes that pressures and saturations remain constant at their initial values throughout each timestep. In effect, the inter-cell flows for each timestep are computed without taking into account the way pressures and saturation are changing. As a result, this method is prone to instability. For example, the procedure may predict that the total mass of a fluid within a cell becomes negative. As the timestep increases, the probability of instability increases until, at some sufficiently long timestep, unphysical predictions are inevitable. In reservoir simulation, these considerations limit the timestep to such a small value that the Fully Explicit method is of no practical use.

IMPES Method

In the IMPES method, saturations are assumed to remain constant at their initial values throughout the timestep. Pressures, on the other hand, are assumed to reach their final values very quickly and to remain there throughout the timestep. In this method, the flow rates and the pressures at the end of the timestep are interdependent and must be determined by iteration. The term "implicit" is used because of the interdependence of the flow rate during a timestep and the pressure solution at the end of the timestep. The pressure- and saturation-dependent terms lag behind the pressure terms. The basic procedure is to obtain a single pressure equation by a combination of flow equations. After the pressure has been advanced in time, the saturations are updated explicitly. When the saturations are calculated, new capillary pressures are calculated, which are explicitly used at the next timestep. Implied in this approach is the belief (or hope) that the saturation and pressure values are not changing very rapidly. In some models the method produces good results. However, the method becomes unstable when there is rapid fluid movement in the reservoir (around the wells, for example) or when capillary pressures affect flow strongly. For this reason, IMPES is often not practical.

Fully Implicit Method

The Fully Implicit method, which is more complex than the Fully Explicit and IMPES methods, is unconditionally stable because it treats both pressure and saturations implicitly. Flow rates are computed using phase pressures and saturations at the end of each timestep. In this method, saturations cannot fall below zero because a fluid can flow only if it is mobile at the at the end of a timestep, and fluids are mobile only for saturations greater than zero. Saturations cannot exceed unity because this would imply negative saturations in other phases. The calculation of flow rates and pressure and saturation solutions involves the solution of nonlinear equations using a suitable iterative technique. As the pressures and saturations are solved, the updating of these terms continues using new values of pressure and saturation. The iteration process terminates when the convergence criteria are satisfied.

The Fully Implicit method is stable for all timestep lengths, and guarantees that saturations remain within physical bounds. The unconditional stability of the Fully Implicit method makes it possible for the simulation to take much longer timesteps than would be possible for a non-implicit computation. Although the Fully Implicit method requires an order of magnitude more computing time per timestep than the IMPES method, the timestep can be several orders of magnitude longer, resulting in a net decrease in computing time.

The main drawback of the Fully Implicit method is the amount of computer time that it requires. In terms of computing cost, the method is generally satisfactory in models of single wells or parts of a reservoir, but it can be quite expensive to use in models of entire reservoirs. Several attempts have been made to reduce the computations required, possibly at the cost of accepting a method that does not permit the timestep sizes of the Fully Implicit method. The sequential implicit method, the adaptive implicit method, and the Cascade method have been proposed as ways of reducing the computational time.

Sequential Implicit Method

The Sequential Implicit method (SEQ method) incorporates implicit treatment of saturations, but without solving simultaneously for pressures and saturations. The SEQ method consists of two steps. The first step solves a set of pressure equations in exactly the same way as is done in the IMPES method. This set comprises a single equation per cell, and solving it yields a complete, new pressure distribution at the end of a timestep. In a second step, the pressure distribution is used to calculate the sum of the velocities of all phases at each boundary between cells. These total velocities are used in constructing a set of saturation equations. This set comprises two equations per cell in three phase cases and one equation per cell in two phase cases and is solved simultaneously to yield saturations at the new time. The second step is an implicit solution for saturations using linearized implicit velocities. Saturations in each cell are determined by using implicit (end-of-time-step) values of relative permeabilities in inter-cell fluid flow terms. This method requires simultaneous solution of all saturation equations. The per-timestep computational cost of the SEQ method, though 50 to 100 percent greater than that of the IMPES method, is typically about one-fifth that of the Fully Implicit method. The SEQ method can take much longer timesteps than the IMPES method, and in some models its timestep size approaches that of the Fully Implicit method; in other models, the SEQ method requires up to several times as many timesteps as the Fully Implicit method. Therefore, in some models the SEQ method takes less computing time overall than the Fully Implicit method; in other models, it takes more.

Adaptive Implicit Method

The Adaptive Implicit method (AIM) is sometimes used in an attempt to combine the superior timestep size of the Fully Implicit method with the low computational cost of IMPES. It is based on the observation that only small regions in the typical model require the stability of Fully Implicit computations, while a simpler method would be adequate in the rest of the model. AIM performs Fully Implicit computations only in the parts of the model where they are believed to be needed and uses IMPES in the rest of the model. Typically, Fully Implicit computations are made in only a small part of the model, containing perhaps ten percent of the model's cells.

The discussion above assumes that the Fully Implicit method can take timesteps of arbitrary length. In theory, this is true. Practically, there are difficulties arising from the need to solve a nonlinear system of equations. The equations are solved using an iterative technique called "the Newton method," which makes successive estimates of the solution. This procedure is often referred to as a Newton iteration. When the Newton method works well, each new estimate is closer to the correct solution than its predecessors. Sometimes, it does not work well, and convergence to the correct solution is obtained slowly or not at all. When convergence is poor, the convergence problem is typically confined to a very few cells. Despite this, the fill Newton iteration computation is normally carried out at all cells (or all implicit cells if AIM is in use). A possible way to improve computational efficiency is to, in some manner, focus the computational effort on the few cells having difficulty.

Cascade Method

The Cascade method provides a way of improving the computational efficiency. This method computes saturation one phase at a time, one cell at a time. At a given point in the computation, the cell at which saturation is currently being computed is selected to be one for which all incoming flows of the selected phase have already been computed. Thus, it is only necessary to compute flows of the phase out of the cell. Assuming that upstream weighting is being used, these flows depend on saturation in the current cell only.

The first step in the Cascade method is to compute pressure, just like the IMPES method. Once all pressures are known, it is always possible to find a cell for which all incoming flows of a selected phase have already been computed. Initially, this is likely to be a cell into which the fluid phase is being injected. Once saturation in this cell has been computed, all flows into at least one of its neighbors will be known. Saturation in this cell can be computed, after which all flows into at least one more cell will be known, etc. In practice, the computation is performed in effect by sorting the cells such that the one with the largest potential is first, the one with the next largest potential second, and so on down to the one with the smallest potential, which is last. Then the cell-by-cell computations are performed in this order. Since all flow into a given cell must come from cells having larger potentials, all flows into the current cell are known at any stage of the computation.

The Cascade method achieves its effectiveness by localizing the nonlinear computations to a single cell and, typically, a single unknown within that cell. Because this problem is nonlinear, it must be solved iteratively. Because the computation involves only one unknown, an iterative procedure to solve it can be selected for reliability rather than efficiency. Only cells at which saturation is changing significantly will require more than one iteration, and only cells at which it is changing rapidly will require more than two or three iterations. As a result, the computational effort is concentrated in the cells in which it is needed most.

The Cascade method is particularly suited for models in which flow of all phases is in the same direction. This condition almost never occurs in practical reservoir models, since phase density differences induce countercurrent flow. To some extent, this problem can be overcome by performing a separate Cascade method computation for each phase. However, the method has other drawbacks. First, in the presence of capillary forces, the assumption that flow of a phase out of a cell depends only on that phase's saturation in the cell is no longer valid. Second, an implicit assumption of the Cascade method is that saturation of a given phase is affected only by flow of that phase. In the presence of interphase mass transfer, this assumption is not satisfied. Perhaps because of these shortcomings, the Cascade method is not widely used.

Linearizations

The linearization step (step 3 of FIG. 1) and the solution step (step 4 of FIG. 1) are dependent on each other. In the process of linearization, the algebraic equations will have different forms depending on the solution technique chosen. For example, the IMPES method linearizes only the pressure-dependent terms, such as specific volume. The specific volume is therefore expressed as a linear function of pressure. The SEQ method linearizes the same pressure-dependent terms with respect to pressure, and it also linearizes phase fractional flow terms with respect to saturations. The Fully Implicit method linearizes the pressure-dependent terms with respect to pressure and the saturation-dependent terms (which comprise the relative permeabilities and capillary pressures) with respect to saturations.

The Fully Implicit method uses the linearization differently from the IMPES method and the SEQ method. In the IMPES and SEQ methods, solving the linearized equations gives a solution at the end of each timestep. In the Fully Implicit method, which uses the Newton method, solving the linearized equations yields approximate solutions. Newton iterations are repeated until the resulting estimates of the solutions are considered to be accurate enough based on pre-specified convergence criteria.

One difficulty with conventional linearization procedures is that under certain reservoir conditions the computed saturations can be negative, a physical impossibility. If subsequent calculations are made based on the impossible saturations, erroneous results are produced. These erroneous results can occur, for example, in a gridcell having a high fluid throughput during a timestep. This occurs frequently near wells, or in gridcells that simulate fractures in a reservoir, where gridcells are small and the fluid velocities are large. Hundreds or thousands of gridcell pore volumes can flow through a gridcell in a single timestep. This high throughput can cause stability problems in reservoir simulation.

The most common way to deal with this potential instability is to use the Fully Implicit method, using a Newton iteration at each timestep with damping used to prevent the iteration from diverging. Because a coupled set of equations is being solved, the Fully Implicit method can be expensive computationally. The SEQ method has also been proposed for high throughput gridcells, but it is typically less stable and usually takes smaller timesteps than the Fully Implicit method.

A need exists for an improved reservoir simulation computation method that is more reliable and accurate than the computational methods used in the past and at the same time is computationally efficient.

SUMMARY

The process of this invention predicts properties of fluids in a fluid-containing physical system, and is particularly suitable for predicting the behavior of a subterranean formation containing multiple fluids (such as oil, gas, and water) and for predicting behavior of multiple fluids in wellbore tubing, surface flowlines, separators and related surface facilities. This simulation process overcomes the shortcomings encountered in the past in using the Fully Implicit method and the SEQ method. Compared to conventional simulators that use the Fully Implicit method or the SEQ method, this invention enables use of longer timesteps when using the SEQ method, and it can reduce the number of iterations for convergence when using the Full Implicit method.

The first step in the process is to equate the physical system being simulated to a volumetric grid system comprising a plurality of gridcells. For each gridcell, nonlinear governing equations are constructed that are representative of rock and fluid properties in each gridcell for each fluid. These equations, which represent the fluid and transport properties as implicit in time, can be constructed using the finite difference method, the finite element method, or the finite volume method. These fluid and transport properties are nonlinear functions of the solution variables and are determined by performing iterative computations. In each iteration of this iterative process, the nonlinear terms are linearized to derive linear equations at a current timestep. The linear equations are then solved to determine an estimated solution at the end of the time interval. Then, linear estimates of the nonlinear fluid and transport properties are computed using the linearizations employed to construct the linear equations, evaluating these linearization at the estimated solution. An improved solution is then determined in a gridcell-by-gridcell computation. This computation requires computing flows into and out of a particular gridcell, which in turn requires fluid and transport properties at the end of the time interval in the particular gridcell and in the gridcells adjacent to it. In computing these flows, the fluid and transport properties in the particular gridcell are determined based on the improved solution, while the linear estimates of the fluid and transport properties are used for these properties in one or more gridcells adjacent to the particular gridcell. The improved solution is then used to predict a property of one or more fluids in the physical system, such as fluid saturation. These calculation steps are repeated for a plurality of timesteps and the results are used to predict a property of the physical system and the fluids it contains as a function of time. The iteration steps are preferably repeated to satisfy a predetermined convergence criterion. Once convergence is reached, the resulting solution provides a prediction of fluids in the physical system.

If the process of this invention is applied to the SEQ method, after computing the pressure and "predicted saturations" in the conventional SEQ method, additional computations are made to update the linearized fractional flows. The updated linearized fractional flows are more accurate than the saturations from which they are computed. The quantities upon which the updated linearized fractional flows are based, which are the updated linearized relative permeabilities and capillary pressures, are then used as input to a gridcell-by-gridcell calculation of the saturations. In this calculation, adjacent gridcell pressures and saturation-dependent terms are treated as "known," with the known values being those resulting from the updated linearization. Stated another way, a gridcell's saturations are computed while holding fixed the adjacent gridcells' linearized relative permeabilities, capillary pressures, and fractional flows. The computed saturations from the additional computation are reasonable and can be used in the next outer iteration in the SEQ method.

If the process of this invention is applied to the Fully Implicit method, the customary Newton method calculation is used to obtain new estimates of pressure and saturation. Linearized relative permeabilities and capillary pressures are then updated based on these new estimates of pressure and saturations. The linearized quantities are then used as input to a gridcell-by-gridcell calculation of the saturations, wherein adjacent gridcell pressures and saturation-dependent terms are treated as "known", with such known values being those resulting from the updated linearization. The computed saturations can then be used in the next Newton iteration for the timestep.

Although the additional computations performed in the practice of this invention can be applied to all gridcells in the simulation process, preferably the additional computations are applied only to those gridcells which incur significant saturation changes during a timestep.

BRIEF DESCRIPTION OF THE DRAWINGS

The present invention and its advantages will be better understood by referring to the following detailed description and the attached Figures.

FIGS. 7A and 7B show a flow chart of various steps used in an embodiment of the invention applied with the SEQ method.

FIGS. 8A and 8B show a flow chart of various steps used in an embodiment of the invention applied with the Fully Implicit method.

DETAILED DESCRIPTION OF THE PREFERRED EMBODIMENTS

The following description makes use of a large number of mathematical symbols, many of which are defined as they occur throughout the text. Additionally, for purposes of completeness, a symbols table containing definitions of symbols used herein is presented following the detailed description.

Overview

Before proceeding with the detailed description, a brief description of mathematical models and solution methods used in modeling underground hydrocarbon-bearing formation will be presented to aid the reader in understanding the invention.

In petroleum reservoir simulation, digital computers are used to solve the mathematical equations that govern the behavior of fluids in porous media. They provide an approximate approach using a suitable gridding format that can accommodate any reservoir description. Since persons skilled in the art are familiar with such equations and methods used to solve them, it is not necessary to describe them here. Nevertheless, an overview of general principles of reservoir simulation is provided to help those not skilled in the art of reservoir simulation have a better understanding of the invention.

This overview uses a simplified treatment of the equations. This treatment is based on several assumptions that would not normally be valid. First, only two substances (oil and water) are assumed to be present, and these fluids are assumed to form the two phases present. Second, properties of these fluids, such as formation volume factor and viscosity, are assumed to be constant. Third, effects of capillary pressure are assumed to be negligible. Fourth, the reservoir being modeled is assumed to be horizontal. Fifth, flow in the reservoir is assumed to be one-dimensional. Sixth, all reservoir properties are assumed to be constant. Seventh, all cells are assumed to have the same dimensions.

Material Balance

In reservoir simulation, the volume of the reservoir is typically discretized into thousands of cells or gridblocks. For the purposes of this overview, however, only a few cells will be used. Regardless of the number of cells, the numerical model is based on two fundamental principles. First, each cell must satisfy material balance. For oil, this means that the oil in a particular cell at the end of a predetermined timestep must satisfy the following equation:

Oil at New Time=Oil at Old Time+Oil Flow In−Oil Flow Out (1)

A similar relationship applies for gas, water, and any other fluids in the reservoir.

Volume Balance

The second principle is that each cell must contain the amount of fluid required to fill it at a given time. For example, if a reservoir contains only oil and water then:

Oil Volume+Water Volume=Cell Volume (2)

Notation

Figure 3:
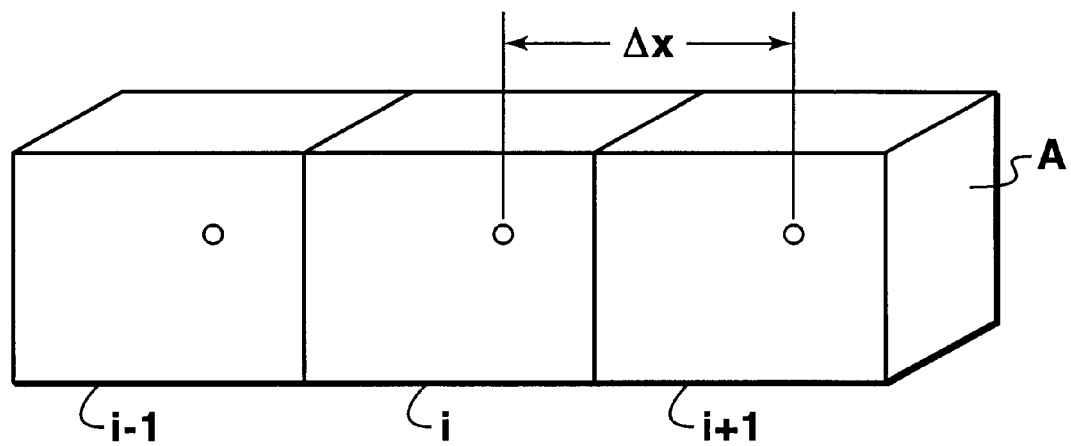
FIG. 3 is a perspective view of three gridcells illustrating gridcell nomenclature used in the description of this invention.

FIG. 3 graphically illustrates three cells of a one-dimensional cell system. The convention used in this description is to identify cells by means of indices (i, i+1, and i−1) as illustrated in FIG. 3. The timesteps (not shown in FIG. 3) are identified by superscripts as n, n+1, n+2, etc. For example, $S_{o,i}^n$ is the saturation of the oil phase at the beginning of timestep n in cell i, and $S_{o,i+1}^{n+1}$ is the saturation of oil in cell i+1 at the beginning of timestep n+1 (which is the same as the end of timestep n). The distance between the centers of two adjacent cells, such as cell i and cell i+1, is represented as $\Delta x$. The cross sectional area between the two cells is represented as A. $\Delta x$, A, and any other quantity that has neither a subscript nor a superscript are constant. The mobility of oil in cell i is $\lambda_{o,i}$, which is equal to $$\frac{k_{ro,i}}{\mu_o},$$

the oil relative permeability ($k_{ro,i}$) in cell i divided by the oil viscosity ($\mu_o$).

Darcy's Law

Referring to FIG. 3, flow is assumed to be from left to right; and, as a result, cell i is upstream of cell i+1. If upstream mobility weighting is used, as is customary, mobility at cell i is used in computing flow between the two cells. The rate of oil flow from cell i into cell i+1 is represented by the following equation, which is a discretization of Darcy's law.

$$F_{o,i+\frac{1}{2}} = \frac{\lambda_{o,i} k A (p_i - p_{i+1})}{\Delta x} \quad (3a)$$

A similar expression can be written for flow of oil from cell i−1 to cell i.

$$F_{o,i-\frac{1}{2}} = \frac{\lambda_{o,i-1} k A (p_{i-1} - p_i)}{\Delta x} \quad (3b)$$

Relative Permeability Characteristics and Implications

Figure 4:
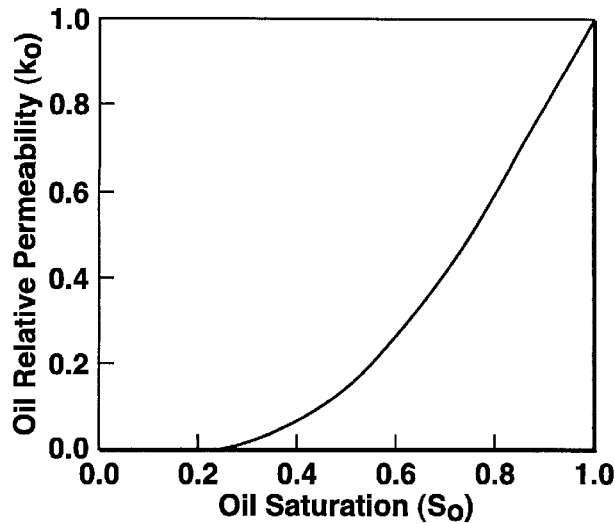
FIG. 4 is a plot of oil relative permeability ($k_o$) as a function of oil saturation ($S_o$) in a typical reservoir.

By definition, mobility ($\lambda$) is proportional to relative permeability. FIG. 4 is a graph of the relative permeability of oil ($k_{ro}$) as a function of oil saturation ($S_o$) in a typical oil-bearing formation. The readiness with which oil flows through the formation decreases as the oil saturation in the formation decreases. The relationship between $k_{ro}$ and $S_o$ depends on the reservoir rock and may vary from one formation to another.

Figure 5:
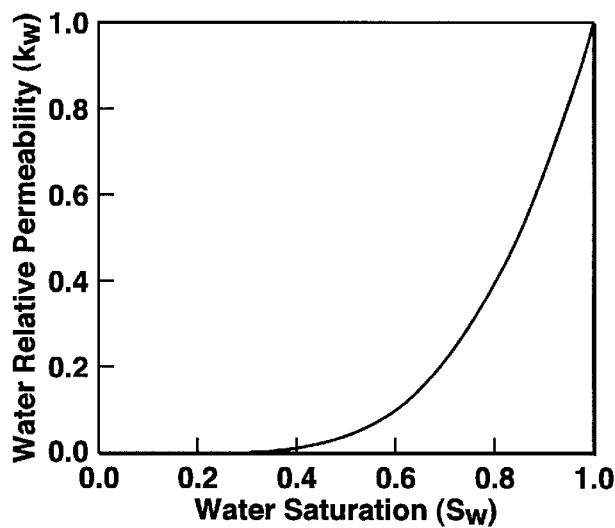
FIG. 5 is a plot of water relative permeability ($k_{rw}$) as a function of water saturation ($S_w$) in a typical reservoir.

FIG. 5 is a plot of the relative permeability of water ($k_{rw}$) as a function of water saturation ($S_w$). Similar to the relationship of $k_{ro}$ to $S_o$ in FIG. 4, the readiness with which water flows through the formation decreases as the water saturation in the formation decreases.

As shown in FIG. 4, oil relative permeability is zero at oil saturations below 0.2. This means that oil cannot move if its saturation is smaller than 0.2 and, in effect, that the oil saturation cannot become smaller than 0.2. Similarly, FIG. 5 shows water relative permeability to be zero at water saturations smaller than 0.25, and water saturation cannot become smaller than 0.25. Given that water saturation cannot drop below 0.25, oil saturation cannot become higher than 0.75, since $S_o=1-S_w$. Thus, the valid range of oil saturations is given by $0.2 \leq S_o \leq 0.75$. Similarly, the valid range for water saturation is $0.25 \leq S_w \leq 0.8$. The use of upstream weighting helps confine saturation to these valid ranges, since a phase can no longer flow out of a cell when its relative permeability becomes zero.

Transport Equations

The amount of oil in a cell is a function of the cell pore volume ($V_p$), the oil saturation ($S_o$) in the cell, and the oil formation volume factor ($B_o$), and can be represented by the following formula:

$$\text{Oil in a Cell} = \frac{V_p S_o}{B_o} \qquad (4)$$

Here $B_o$ is the oil formation volume factor, which is the ratio of the volume occupied by oil in the reservoir to its volume at standard surface conditions.

The pore volume is normally a function of pressure, but it is not being treated as such in this overview. In a predetermined timestep, the change in the amount of oil in a given cell can be represented as:

$$\text{Oil at New Time} - \text{Oil at Old Time} = \frac{V_p}{B_o}(S_o^{n+1} - S_o^n) \qquad (5)$$

For a given timestep ($\Delta t$), the material balance equation of a cell can be represented as $$\frac{V_p}{B_o}S_o^{n+1} - \frac{V_p}{B_o}S_o^n = \Delta t(\text{Oil Flow Rate In} - \text{Oil Flow Rate Out}) \qquad (6)$$

This can be rearranged to yield an equation for oil saturation change in a cell over the timestep.

$$S_o^{n+1} - S_o^n = \frac{B_o \Delta t}{V_p}(\text{Oil Flow Rate In} - \text{Oil Flow Rate Out}) \qquad (7)$$

If the preceding equation is applied to cell i, the Oil Flow Rate In is the flow rate from cell i−1 to cell i, which is given by equation (4). Similarly, the Oil Flow Rate Out is the rate from cell i to cell i+1, which is given by equation (3). Substituting those equations into equation (7) yields $$S_{o,i}^{n+1} - S_{o,i}^n = \frac{B_o \Delta t}{V_p}\left(\frac{\lambda_{o,i-1} kA(p_{i-1} - p_i)}{\Delta x} - \frac{\lambda_{o,i} kA(p_i - p_{i+1})}{\Delta x}\right) \qquad (8)$$

This equation can be solved for the new oil saturation, resulting in what is called the oil saturation equation.

$$S_{o,i}^{n+1} = S_{o,i}^n + \frac{B_o \Delta t}{V_p}\left(\frac{\lambda_{o,i-1} kA(p_{i-1} - p_i)}{\Delta x} - \frac{\lambda_{o,i} kA(p_i - p_{i+1})}{\Delta x}\right) \qquad (9)$$

The same equation applies for water, with the subscript o being replaced by w. Thus, the water saturation equation is $$S_{w,i}^{n+1} = S_{w,i}^n + \frac{B_w \Delta t}{V_p}\left(\frac{\lambda_{w,i-1} kA(p_{i-1} - p_i)}{\Delta x} - \frac{\lambda_{w,i} kA(p_i - p_{i+1})}{\Delta x}\right) \qquad (10)$$

An implication of the volume balance principle, equation (2), is that the sum of the water saturation and the oil saturation equals unity, or $$S_o + S_w = 1 \qquad (11)$$

If equations (9) and (10) are added and the principle of equation (11) is used, the result is $$\frac{\Delta t}{V_p}\left(\frac{(B_o \lambda_{o,i-1} + B_w \lambda_{w,i-1})kA(p_{i-1} - p_i)}{\Delta x} - \frac{(B_o \lambda_{o,i} + B_w \lambda_{w,i})kA(p_i - p_{i+1})}{\Delta x}\right) = 0 \qquad (12)$$

This can be simplified to $$(B_o \lambda_{o,i-1} + B_w \lambda_{w,i-1})(p_{i-1} - p_i) - (B_o \lambda_{o,i} + B_w \lambda_{w,i})(p_i - p_{i+1}) = 0 \qquad (13)$$

This equation can be rearranged to yield the pressure equation used by the IMPES method and the SEQ method.

$$(B_o \lambda_{o,i-1} + B_w \lambda_{w,i-1})p_{i-1} - \qquad (14)$$
$$(B_o \lambda_{o,i-1} + B_w \lambda_{w,i-1} + B_o \lambda_{o,i} + B_w \lambda_{w,i})p_i +$$
$$(B_o \lambda_{o,i} + B_w \lambda_{w,i})p_{i+1} = 0$$

Note that no time superscripts appear in this equation. In this overview, the fluids are assumed to have constant densities. If density was allowed to vary, it would be necessary to introduce time into the above equation. Also, recall that, although saturation does not appear in the equation, mobility ($\lambda$) is a function of saturation. As a result, pressure indirectly depends on saturation.

The SEQ method requires a special form of the saturation equations, which can be obtained as follows. The total fluid flow rate is equal to the sum of the oil and water flow rates. For flow between cells i and i+1, this can be written $$F_{T,i+\frac{1}{2}} = F_{o,i+\frac{1}{2}} + F_{w,i+\frac{1}{2}} \qquad (15)$$

Equation (3) provides an expression for $$F_{o,i+\frac{1}{2}},$$

and a similar expression can be written for $$F_{w,i+\frac{1}{2}}.$$

Substituting these into the above equation yields $$F_{T,i+\frac{1}{2}} = \frac{\lambda_{o,i} kA(p_i - p_{i+1})}{\Delta x} + \frac{\lambda_{w,i} kA(p_i - p_{i+1})}{\Delta x} \qquad (16)$$

This can be solved for the pressure difference, $p_i - p_{i+1}$, yielding $$p_i - p_{i+1} = \frac{F_{T,i+\frac{1}{2}}}{\frac{(\lambda_{o,i} + \lambda_{w,i})kA}{\Delta x}} \qquad (17)$$

Substituting this expression into equation (3a) and canceling certain terms yields $$F_{o,i+\frac{1}{2}} = \frac{\lambda_{o,i}}{\lambda_{o,i} + \lambda_{w,i}} F_{T,i+\frac{1}{2}} \qquad (18)$$

This can be written $$F_{o,i+\frac{1}{2}} = f_{o,i} F_{T,i+\frac{1}{2}} \qquad (19)$$

where $f_{o,i}$ is the oil fractional mobility, defined by $$f_{o,i} = \frac{\lambda_{o,i}}{\lambda_{o,i} + \lambda_{w,i}} \qquad (20)$$

Equation (19) can be substituted into the oil saturation equation (equation (9)) to yield $$S_{o,i}^{n+1} = S_{o,i}^{n} + \frac{B_o \Delta t}{V_p} \left( f_{o,i-1} F_{T,i-\frac{1}{2}} - f_{o,i} F_{T,i+\frac{1}{2}} \right) \qquad (21)$$

The equivalent expression for water is $$S_{w}^{n+1} = S_{w}^{n} + \frac{B_w \Delta t}{V_p} \left( f_{w,i-1} F_{T,i-\frac{1}{2}} - f_{w,i} F_{T,i+\frac{1}{2}} \right) \qquad (22)$$

Solution Methods

The IMPES method begins each timestep with a pressure solution using equation (14). The mobilities are evaluated at the beginning of the timestep, which means they are based on the saturations at the beginning of the timestep. The pressures that are computed are interpreted as applying at the end of the timestep and throughout it. The resulting equation is $$(B_o \lambda_{o,i-1}^n + B_w \lambda_{w,i-1}^n) p_{i-1}^{n+1} - \qquad (23)$$
$$(B_o \lambda_{o,i-1}^n + B_w \lambda_{w,i-1}^n + B_o \lambda_{o,i}^n + B_w \lambda_{w,i}^n) p_i^{n+1} +$$
$$(B_o \lambda_{o,i}^n + B_w \lambda_{w,i}^n) p_{i+1}^{n+1} = 0$$

Once pressures have been determined, saturations are computed. The saturation of either phase can be computed. Assuming that oil saturation is computed, the resulting expression is $$S_o^{n+1} = S_o^n + \frac{B_o \Delta t}{V_p} \left( \frac{\lambda_{o,i-1}^n kA(p_{i-1}^{n+1} - p_i^{n+1})}{\Delta x} - \frac{\lambda_{o,i}^n kA(p_i^{n+1} - p_{i+1}^{n+1})}{\Delta x} \right) \qquad (24)$$

Assuming that for whatever reason $$\frac{\lambda_{o,i-1}^n kA(p_{i-1}^{n+1} - p_i^{n+1})}{\Delta x}$$

is smaller than $$\frac{\lambda_{o,i}^n kA(p_i^{n+1} - p_{i+1}^{n+1})}{\Delta x},$$

then $S_o^{n+1}$ will be smaller than $S_o^n$. How much smaller it is will depend on $\Delta t$. The larger $\Delta t$ is, the smaller $S_o^{n+1}$ will be. A value of $\Delta t$ can be found that will make $S_o^{n+1}$ equal to zero, equal to $-1$, or equal to any other value desired, as long as it is smaller than $S_o^n$.

This is a problem because there is a certain valid range for oil saturation. In principle, it can range from zero to one. In actuality, the nature of the relative permeabilities restricts it to a narrower range. For the relative permeabilities illustrated in FIG. 4., for example, the range is $0.2 \leq S_o \leq 0.75$. If the timestep ($\Delta t$) becomes too large, the computed oil saturation can fall below this valid range, a result that is incorrect.

In addition, this behavior can lead to stability problems. On one timestep in this example, the saturation drops too low, perhaps below its residual of 0.2. On the next timestep, oil cannot move out of the cell because of its low saturation, but it can flow in. The saturation becomes too large. Because the saturation is now too large, too much oil can flow out, so its saturation drops too much on the next timestep, and so on. The remainder of this overview discusses methods intended to address this stability problem.

The SEQ method begins each timestep the same way the IMPES method does, by solving a set of equations (23) for pressure. Given these pressures, it next computes total flow rates between cells using equation (16) with mobilities evaluated at the old time level and pressures evaluated at the new time level.

$$F_{T,i+\frac{1}{2}} = \frac{\lambda_{o,i}^n kA(p_i^{n+1} - p_{i+1}^{n+1})}{\Delta x} + \frac{\lambda_{w,i}^n kA(p_i^{n+1} - p_{i+1}^{n+1})}{\Delta x} \qquad (25)$$

Given these total flow rates, it is now desired to compute the new saturations using equation (21) with the fractional flows evaluated at the new time level.

$$S_{o,i}^{n+1} = S_{o,i}^n + \frac{B_o \Delta t}{V_p} \left( f_{o,i-1}^{n+1} F_{T,i-\frac{1}{2}} - f_{o,i}^{n+1} F_{T,i+\frac{1}{2}} \right) \qquad (26)$$

However, this cannot be done because the oil fractional flow ($f_o$) terms depend on the oil saturations, which are not yet known at the new time level. Instead, these terms are linearized with respect to oil saturation, resulting in the following expression.

$$f_{o,i}^{n+1} = f_{o,i}^n + \frac{df_{o,i}^n}{dS_{o,i}} (S_{o,i}^{n+1} - S_{o,i}^n) \qquad (27)$$

Substituting equation (27) into equation (26) yields $$S_{o,i}^{n+1} = S_{o,i}^n + \frac{B_o \Delta t}{V_p} \left[ f_{o,i-1}^n + \frac{df_{o,i-1}^n}{dS_{o,i-1}} (S_{o,i-1}^{n+1} - S_{o,i-1}^n) \right] F_{T,i-\frac{1}{2}} - \qquad (28)$$
$$\frac{B_o \Delta t}{V_p} \left[ f_{o,i}^n + \frac{df_{o,i}^n}{dS_{o,i}} (S_{o,i}^{n+1} - S_{o,i}^n) \right] F_{T,i+\frac{1}{2}}$$

With the exception of the new time level saturations, all of the terms in this equation are known. A set of equations is formed by writing this one for each cell. This set can be solved to yield the new saturations.

As described above, the SEQ method is purely sequential. First, pressures are computed, then saturations are computed, then the timestep is finished. This can cause problems in areas of the formation having high flowrates during a timestep.

Figure 6:
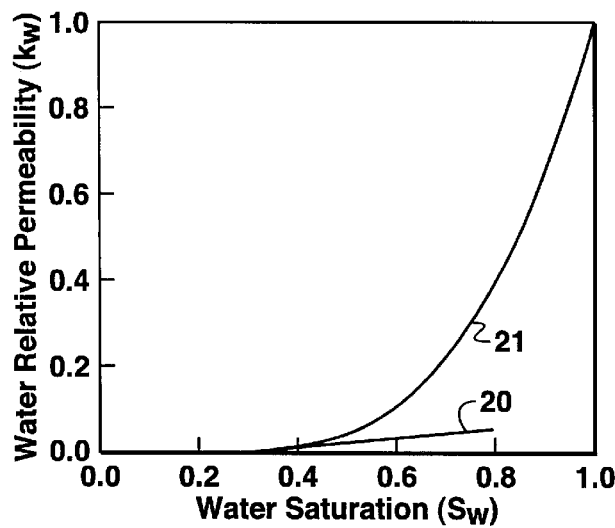
FIG. 6 is a plot, similar to FIG. 4, illustrating an example of the linearization of the water relative permeability to water saturation relationship.

FIG. 6 shows the same graphical relationship of relative water permeability and water saturation as FIG. 5, except that a line 20 has been drawn tangentially to the $k_w$–$S_w$ curve 21 at the point on curve 21 that represents a water saturation of 0.4. Line 20 therefore represents the linearization of the water relative permeability that would be used at a water saturation of 0.4.

Assume that the timestep size is such that 100 pore volumes of fluid pass through a gridcell in a timestep, the current water saturation in this gridcell at the beginning of the timestep is 0.4, and that 10% of the fluid entering the gridcell in the timestep is water. This means that the volume of the water entering the gridcell during the timestep will be 10 of the gridcell's pore volumes. Clearly the gridcell cannot hold this much water, so most of it must flow out during the timestep. Furthermore, since the current water saturation is 0.4 and the maximum possible water saturation is 0.8 (1.0 minus the minimum oil saturation of 0.2), at least 9.6 of the 10 pore volumes of water entering the gridcell during the timestep must also leave it. In fact, the amount of water leaving the gridcell during the timestep must be between 9.6 and 10 pore volumes (assuming that water saturation is increasing).

The water relative permeability must be large enough to permit this to happen. Assume that, given the oil relative permeability and oil and water viscosities, a water relative permeability of 0.048 would lead to a flow of 9.6 pore volumes and 0.05 would lead to flow of 10 pore volumes. If the flow into the gridcell is correct, the water relative permeability must lie in the narrow range between these two values.

The question is at what water saturation is such a relative permeability obtained. The linearization of water relative permeability about a water saturation of 0.4 is given by $$k_{rw}^{linear} = 0.008 + 0.12(S_w - 0.4) \quad (29)$$

This expression requires a water saturation of 0.75 to yield a water relative permeability value of 0.05. As a result, solution of the equations stemming from the linearization would yield a water saturation slightly smaller than 0.75, and this value would be used to begin the next iteration. This is significantly in error, since the actual function yields 0.05 at a saturation of less than 0.53. It would be much better to begin the next iteration with a value around 0.53 than one around 0.75.

This erroneous result can, in principle, be eliminated by performing the SEQ method iteratively in a fashion similar to that of the fully implicit method, which is described below.

The SEQ method is much more stable than the IMPES method, which means that it can take much longer timesteps, thereby reducing computing time requirements. However, there are some reservoir conditions in which its stability is inadequate. The Fully Implicit method is often used in these reservoir conditions.

The Fully Implicit method simultaneously solves for oil and water saturations at the new time level using equations (9) and (10) with all terms evaluated at the new time level.

$$S_{o,i}^{n+1} = S_{o,i}^n + \frac{B_o \Delta t}{V_p}\left(\frac{\lambda_{o,i-1}^{n+1} kA(p_{i-1}^{n+1} - p_i^{n+1})}{\Delta x} - \frac{\lambda_{o,i}^{n+1} kA(p_i^{n+1} - p_{i+1}^{n+1})}{\Delta x}\right) \quad (30a)$$

$$S_{w,i}^{n+1} = \quad (30b)$$
$$S_{w,i}^n + \frac{B_w \Delta t}{V_p}\left(\frac{\lambda_{w,i-1}^{n+1} kA(p_{i-1}^{n+1} - p_i^{n+1})}{\Delta x} - \frac{\lambda_{w,i}^{n+1} kA(p_i^{n+1} - p_{i+1}^{n+1})}{\Delta x}\right)$$

However, these are nonlinear equations in which none of the terms can be known until all are known. They must be solved iteratively. From the definition of the interblock flow, equations (30a) and (30b) can be rewritten $$S_{o,i}^{n+1} = S_{o,i}^n + \frac{B_o \Delta t}{V_p}\left(F_{o,i-\frac{1}{2}}^{n+1} - F_{o,i+\frac{1}{2}}^{n+1}\right) \quad (31)$$

$$S_{w,i}^{n+1} = S_{w,i}^n + \frac{B_w \Delta t}{V_p}\left(F_{w,i-\frac{1}{2}}^{n+1} - F_{w,i+\frac{1}{2}}^{n+1}\right) \quad (32)$$

The flow terms are linearized with respect to saturation and pressure, making use of the fact that $S_w = 1 - S_o$. The result is $$F_{o,i+\frac{1}{2}}^{n+1,k+1} = \frac{\lambda_{o,i}^{n+1,k} kA(p_i^{n+1,k} - p_{i+1}^{n+1,k})}{\Delta x} + \quad (33)$$
$$\frac{\lambda_{o,i}^{n+1,k} kA(\delta p_i^{n+1,k} - \delta p_{i+1}^{n+1,k})}{\Delta x} + \frac{d\lambda_{o,i}^{n+1,k}}{dS_{o,i}} \delta S_{o,i}^{n+1,k} \frac{kA(p_i^{n+1,k} - p_{i+1}^{n+1,k})}{\Delta x}$$

where $$\delta p_i^{n+1,k} = p_i^{n+1,k+1} - p_i^{n+1,k} \quad (34)$$

$$\delta S_{o,i}^{n+1,k} = S_{o,i}^{n+1,k+1} - S_{o,i}^{n+1,k} \quad (35)$$

and the superscript k denotes iteration number. The equivalent expression for water is $$F_{w,i+\frac{1}{2}}^{n+1,k+1} = \frac{\lambda_{w,i}^{n+1,k} kA(p_i^{n+1,k} - p_{i+1}^{n+1,k})}{\Delta x} + \quad (36)$$
$$\frac{\lambda_{w,i}^{n+1,k} kA(\delta p_i^{n+1,k} - \delta p_{i+1}^{n+1,k})}{\Delta x} + \frac{d\lambda_{w,i}^{n+1,k}}{dS_{o,i}} \delta S_{o,i}^{n+1,k} \frac{kA(p_i^{n+1,k} - p_{i+1}^{n+1,k})}{\Delta x}$$

Substituting equations (33) through (36) into equations (31) and (32) yields a set of equations, two at each cell, in which the unknowns are $\delta S_{o,i}^{n+1,k}$ and $\delta P_i^{n+1,k}$. This set of equations can be solved using methods known to persons skilled in the art. $\delta S_{o,i}^{n+1,k}$ and $\delta P_i^{n+1,k}$ are solved iteratively until the iteration has converged, at which point they will have become negligibly small. Typically, several iterations are required.

A drawback of this method is its per-timestep computational expense. In this simplified model, the set of equations that must be solved has two equations for each cell, rather than just one as does the set of the IMPES method or the SEQ method pressure equations. Furthermore, the set of equations must be solved for each iteration, of which there are typically several. Overall, a typical computational cost of a fully implicit timestep is ten times that of an IMPES method and five times that of a SEQ method timestep, but it can be much more.

Furthermore, the method does not always converge. When it fails, the timestep must be repeated with a smaller $\Delta t$.

Preferred Embodiments

The inventor has discovered that in solution of the governing flow and conservation equations used in simulating fluid properties and behavior in physical systems, the linearized values of quantities used to compute flow can be more accurate than the values of the solution variables from which the linearized values are derived. This discovery forms the basis for the simulation process of this invention. In the example discussed above with reference to FIG. 6, the linearized value of relative permeability differed significantly from the true value. It would normally be expected that the difference constituted an error in the linearization. Surprisingly, in reservoir simulation calculations the linearized relative permeability is often more accurate than the saturation.

Although the primary focus of reservoir simulation is the hydrodynamics of flow within a reservoir, it also can involve modeling the total petroleum system which includes the reservoir, the surface facilities that contain fluids, and any interrelated significant activity. Those skilled in the art will recognize that the invention can also be applied to the equations governing flow through non-reservoir fluid-containing media such as wellbore tubing, surface flow lines, separators, and other facilities.

Figure 1:
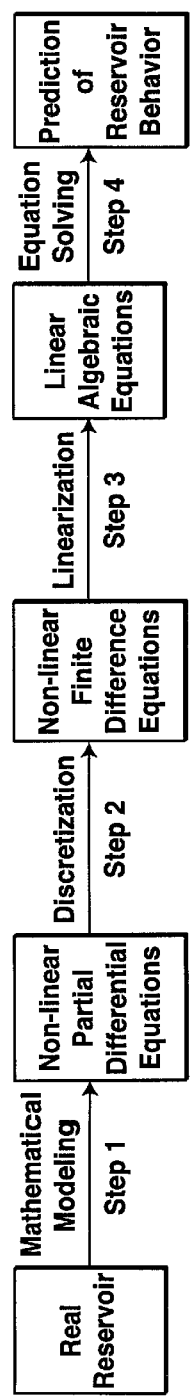
FIG. 1 (PRIOR ART) is a schematic diagram of the basic steps in a conventional reservoir simulation process.
Figure 2:
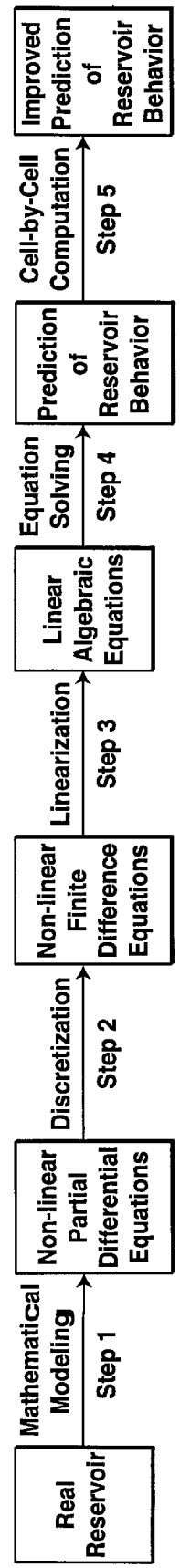
FIG. 2 is a schematic diagram illustrating the basic steps of a reservoir simulation process in accordance with the practice of this invention.

FIG. 2 illustrates in schematic form the basic steps of reservoir simulation in accordance with the practice of the present invention. Steps 1 through 4 of FIG. 2 are substantially the same as the corresponding steps of a conventional reservoir simulation process outlined in FIG. 1, except that in the practice of this invention the linearization of the finite difference equations (step 3) uses either the Fully Implicit method or the SEQ method. If the Fully Implicit method is being used, step 4 solves for pressures and saturations simultaneously. If the SEQ method is being used, step 4 solves first for fluid pressures and then for saturations. The inventor has discovered that the results obtained from step 4 can be substantially improved by performing an additional computation. After step 4 has been completed, as illustrated in FIG. 2, a fifth step of performing a gridcell-by-gridcell computation is made to improve the prediction of reservoir behavior. First, to prepare for this step, linear estimates of nonlinear fluid and transport properties at the end of the time interval are evaluated at the solution (step 4) using the linearizations employed in linearizing the finite difference equations (step 3). In the gridcell-by-gridcell computation, the linear estimates of fluid and transport properties are used in one or more gridcells adjacent to a particular gridcell, while in the particular gridcell, fluid and transport properties are computed based on the improved solution in that gridcell.

The step 5 computation can be applied to all gridcells in a grid system being modeled. However, to economize on computational time, the additional computation is preferably applied only to those gridcells that undergo significant fluid saturation changes during a timestep. If the Adaptive Implicit method version of the Fully Implicit method is used as the form of equation solution, it is further preferred that the additional computation be applied only within fully implicit regions of the Adaptive Implicit method.

The present invention does not limit the number and type of solution variables that can be predicted for a reservoir. Non-limiting examples of three common sets of solution variables are as follows:

1. Pressure, two saturations, selected mole fractions (in models with more than two components), and temperature (in thermal models);
2. Pressure, mass of each component, and energy (in thermal models); and
3. Pressure, total density of each component, and energy density (in thermal models).

Other quantities can be derived from these variables, such as oil, gas, and/or water production rates.

The first step in the practice of this invention is to equate the formation being modeled to a volumetric system comprising a plurality of gridcells. The practice of this invention is not limited to any particular type or size of gridcells. For purposes of describing the invention only, FIG. 3 illustrates a Cartesian gridcell or gridblock system. The gridcells may, however, be of any geometric shape, such as parallelepipeds (or cubes) or hexahedrons (having four vertical corner edges which may vary in length), or tetrahedrons, rhomboids, trapezoids, or triangles. The grid may comprise rectangular cells organized in a regular, structured fashion, or it may comprise cells having a variety of shapes laid out in an irregular, unstructured fashion. Examples of structured and unstructured gridcell systems are described in *Gridding Techniques in Reservoir Simulation*, by Heinemann, Z. E. and Brand, C. W., 1st/2nd Stanford University & Leoben Mining University Reservoir Simulation International Forum, Alpbach, Austria (Sept 1988/Sept 1989).

Finite difference equations representative of rock and fluid properties for each fluid are constructed for each gridcell. The fluid properties in these equations are expressed as being implicit in time. Examples of such rock properties include porosity, capillary pressure, and relative permeability to each fluid phase. Examples of fluid properties include oil viscosity, oil formation volume factor ($B_o$), and initial pressure, temperature, and saturation of all fluids in each gridcell. These properties can be obtained in whole or part from actual reservoir data, or they can be determined experimentally or estimated, depending on the type of reservoir simulation being performed and the availability of actual reservoir data. Construction of suitable finite difference equations representative of reservoir conditions is well known to those skilled in the art.

The description of the invention that follows is specific to its application in connection with finite difference methods. Those skilled in the art will recognize that the invention can also be applied in connection with finite element methods or finite volume methods. When it is applied with finite element methods, the gridcells become finite elements, and when it is applied with finite volume methods, the gridcells become finite volumes. The finite difference methods, the finite element methods, and the finite volume methods reduce partial differential equations to a finite-dimensional system of algebraic equations. Based on the teachings set forth herein with respect to discretization using the finite difference methods, those skilled in the art can use the finite element and the finite volume methods in the practice of the present invention.

The nonlinear fluid and transport properties in the finite difference equations at the end of each time interval are determined by performing an iterative computation. For each iteration within this iterative computation, the linear approximations of fluid and transport properties are determined, and these linear approximations are used to derive linear equations. The linear equations can be of the form used by either the Fully Implicit method or the SEQ method. The linear equations are then solved to yield an estimate of the solution at the end of the time interval. In the practice of the present invention, the following additional computation is performed to determine an improved solution based on the results obtained in step 4.

First, determine at which gridcells the additional computation should be performed. As stated above, although the additional computations of this invention can be applied to all gridcells, to save computer time, the additional computation is preferably applied only to gridcells which are small compared to their volumetric throughput during a timestep or exhibit large solution changes during a timestep. The additional computation can, for example, be applied to gridcells having more than about two gridcell pore volumes of water passing through them during a timestep or to cells at which saturation changes more than ten percent during a timestep. Persons skilled in the art can readily determine which gridcells undergo such changes. As part of the computations performed in step 4 (FIG. 2), quantitative criteria can be used to establish which cells quality for the additional computation. Non-limiting examples of suitable criteria may include pressure change, saturation change, mole fraction change, temperature change, residual error at the beginning of the outer iteration, and other similar quantities.

umes were injected in a timestep. Under these assumed conditions, the SEQ method yielded the solution set forth in Table 1.

TABLE 1

SEQ Results for Timestep Size of 10 Gridcell Pore Volumes

| Gridcell Number (i) | 1 | 2 | 3 | 4 | 5 | 6 | 7 |
|---|---|---|---|---|---|---|---|
| $S_{o,i}^{1,1,1}$ | −6.2503 | −1.1313 | 0.3229 | 0.7361 | 0.8534 | 0.8868 | 0.8962 |
| $f_{o,i}^{1,1,1}$ | 0.7150 | 0.9182 | 0.9759 | 0.9923 | 0.9969 | 0.9982 | 0.9986 |

Second, compute linear estimates of nonlinear fluid and transport properties using the linear approximations of these properties evaluated at the estimated solution. These linear estimates will be needed at all gridcells that are adjacent to, and are therefore in direct-flow communication with, the gridcells at which the present invention's additional computation is being performed. If, for example, the additional computation is to be performed at gridcell i, the neighboring gridcells may include both gridcell i−1 and gridcell i+1, since fluids flow from gridcell i−1 to gridcell i and fluids flow from gridcell i to gridcell i+1.

Third, calculate the improved solution at the gridcells in which the additional computation is being performed. In this calculation, computation of flow between a particular gridcell and the gridcells adjacent to it is based on nonlinear fluid and transport properties computed at the improved solution in the particular gridcell and the linear estimates of nonlinear fluid and transport properties in the adjacent gridcells. This calculation will, almost always, require a nonlinear iteration. This iteration can be performed by a variety of methods. All iterative methods involve starting with some initial guess for the unknown term and applying some repetitive calculation to improve the guess until, after a sufficient number of iterations, the simultaneous equations are satisfied to within a predetermined tolerance. The solution is said to have converged when calculated values do not change between iterations or when the differences fall within an acceptance criterion. It is desirable that the iterative method chosen be fast, but it is more important that it be reliable.

As a last step, the iterative computations are repeated to satisfy a predetermined convergence criteria.

EXAMPLE

The following example is provided to further illustrate the practice of this invention. In this example, the benefits of performing the additional computation of step 5 (FIG. 2) are simulated. It was assumed that oil and water flowed in a one-dimensional model similar to the gridcells illustrated in FIG. 3. The oil and water relative permeabilities were assumed to have the simple functional forms $$k_{ro} = S_o^2 \quad (37)$$

and $$k_{rw} = S_w^3 \quad (38)$$

Oil and water viscosities and formation volume factors were equal to one. The initial oil saturation is constant at 0.9. Water was injected at the left-most gridcell, and the injection rate-timestep product was such that ten gridcell pore vol- Referring to Table 1, $S_{o,i}^{1,1,l}$ is the oil saturation in gridcell i computed for the first timestep (denoted by the first superscript) and the first outer iteration (denoted by the second superscript) of this timestep. The superscript l indicates that this is the linearized value. $f_{o,i}^{1,1,l}$ is the oil fraction flow defined in a similar fashion. The outer iteration will be discussed below. The computed saturations in gridcells 1 and 2 are −6.2503 and −1.1313, respectively. These are erroneous by a large amount, since saturation cannot be less than zero. Table 1's third row shows the fractional flow computed by linearization. These values, though perhaps not correct, are at least feasible and are more realistic than the saturations upon which they are based. The inventor has discovered that better accuracy can be obtained by determining saturations based upon the linearized fractional flows, rather than by the conventional practice of determining fractional flows based upon saturations. This discovery is exploited in two embodiments described below. One embodiment is applied with the SEQ method and the other embodiment is applied with the Fully Implicit method.

SEQ Method Example Computations

The invention was tested on the simple one-dimensional series of rectangular gridcells in which water is injected into the left block. FIG. 3 shows three gridcells in the series of gridcells. Water, oil, and total mobilities are given by $$\lambda_w = S_w^3 = (1-S_o)^3 \quad (A-1)$$

$$\lambda_o = S_o^2 \quad (A-2)$$

$$\lambda_t = \lambda_w + \lambda_o \quad (A-3)$$

Oil saturation is solved for. Water and oil mobility derivatives with respect to oil saturation are $$\frac{d\lambda_w}{dS_o} = -3(1-S_o)^2 \quad (A-5)$$

$$\frac{d\lambda_o}{dS_o} = 2S_o \quad (A-6)$$

The oil fractional flow and its derivative with respect to oil saturation are $$f_o = \frac{\lambda_o}{\lambda_t} \quad (A-7)$$

-continued $$\frac{df_o}{dS_o} = \frac{\lambda_w \frac{d\lambda_o}{dS_o} - \lambda_o \frac{d\lambda_w}{dS_o}}{\lambda_t^2} \qquad (A\text{-}8)$$

The linearized flow during a timestep from gridcell i to i+1 is given by $$F_{oi+\frac{1}{2}}^{n+1,k+1,l} = q_w \left[ f_{oi}^{n+1,k} + \frac{df_{oi}^{n+1,k}}{dS_{oi}} \delta S_{oi}^{n+1,k,l} \right] \qquad (A\text{-}9)$$

where $q_w$ is the water injection rate and $\delta S_{o1}^{n+1,k,l}$ is defined in equation (35).

Only water, and thus no oil, flows into the first gridcell. As a result, the linear saturation change in it is $$\delta S_{o1}^{n+1,k,l} = S_{o1}^{n} - S_{o1}^{n+1,k} + \frac{q_w \Delta t}{V_P} \left[ -f_{o1}^{n+1,k} - \frac{df_{o1}^{n+1,k}}{dS_{o1}} \delta S_{o1}^{n+1,k,l} \right] \qquad (A\text{-}10)$$

Solving this yields $$\delta S_{o1}^{n+1,k,l} = \frac{S_{o1}^{n} - S_{o1}^{n+1,k} - \frac{q_w \Delta t}{V_P} f_{o1}^{n+1,k}}{1 + \frac{q_w \Delta t}{V_P} \frac{df_{o1}^{n+1,k}}{dS_{o1}}} \qquad (A\text{-}11)$$

The linearized fractional flow out of the first gridcell is then computed as $$f_{oi}^{n+1,k+1,l} = f_{oi}^{n+1,k} + \frac{df_{oi}^{n+1,k}}{dS_{oi}} \delta S_{oi}^{n+1,k,l} \qquad (A\text{-}12)$$

where i=1.

Then, given the linearized fractional flow at an arbitrary gridcell i−1, the linearized saturation change at gridcell i can be computed by $$\delta S_{oi}^{n+1,k,l} = \frac{S_{oi}^{n} - S_{oi}^{n+1,k} + \frac{q_w \Delta t}{V_P} \left[ f_{oi-1}^{n+1,k+1,l} - f_{oi}^{n+1,k} \right]}{1 + \frac{q_w \Delta t}{V_P} \frac{df_{oi}^{n+1,k}}{dS_{oi}}} \qquad (A\text{-}13)$$

The procedure for computing the linear saturation changes and linearized fractional flows is as follows.
1. Compute the linear saturation change at gridcell 1 using Eq. (A-11). Update the "linear" saturation by $S_{oi}^{n+1,k+1,l} = S_{oi}^{n+1,k} + \delta S_{oi}^{n+1,k,l}$.
2. Compute the linearized fractional flow from gridcell 1 to gridcell 2 using Eq. (A-12) with i=1.
3. Beginning at gridcell 2, for each gridcell first compute the linear saturation change using Eq. (A-13) then compute the linearized fractional flow using Eq. (A-12). Continue until these computations have been performed for all gridcells.

This simplified procedure can be used because the model is one-dimensional, incompressible, and all flow is in the direction of increasing i. Because the model is one-dimensional and incompressible, the total fluid velocity is constant and it is not necessary to solve for pressure. Because the model is one-dimensional and flow is unidirectional, the computational procedure can proceed from small i to large i, as described above. In a more general model, it is necessary to solve matrix equations to first determine pressure changes and then determine linear saturation changes.

The next step is to compute the improved saturation estimates. The computation is performed a gridcell at a time and is based on the following equation.

$$S_{oi}^{n+1,k+1} = S_{oi}^{n} + \frac{q_w \Delta t}{V_P} \left[ f_{oi-1}^{n+1,k+1,l} - f_{oi}^{n+1,k+1} \right] \qquad (A\text{-}14)$$

Flow into the gridcell is based on the linearized fractional flow. Flow out is based on the gridcell's final saturation. The computation must be performed iteratively. The reguli falsi method was used. The method works by bounding the solution, then repeatedly narrowing the bounds. The following objective function is used for the $m^{th}$ iteration of the reguli falsi method.

$$F_{obj,i}^{m} = S_{oi}^{n+1,k+1,m} + \frac{q_w \Delta t}{V_P} f_{oi}^{n+1,k+1,m} - T_{oi}^{n+1,k+1,l} \qquad (A\text{-}15)$$

where $$T_{o1}^{n+1,k+1,l} = S_{o1}^{n} + \frac{q_w \Delta t}{V_P} \qquad (A\text{-}16a)$$

$$T_{oi}^{n+1,k+1,l} = S_{oi}^{n} + \frac{q_w \Delta t}{V_P} f_{oi-1}^{n+1,k+1,l}, \quad i > 1 \qquad (A\text{-}16b)$$

is the gridcell pore volume divided into the sum of oil in the gridcell at the beginning of the timestep plus the (linearized) amount flowing in during the timestep.

The objective of the iteration is to find a value of $S_{oi}^{n+1,k+1,m}$ that causes $F_{obj,i}^{m}$ to become zero. The initial bounds on the solution are $$S_{min} = 0 \qquad (A\text{-}17)$$

and $$S_{max} = 1 \qquad (A\text{-}18)$$

At these saturations, the objective function is respectively $$F_{min} = -T_{oi}^{n+1,k+1,l} \qquad (A\text{-}19)$$

and $$F_{max} = 1 + \frac{q_w \Delta t}{V_P} - T_{oi}^{n+1,k+1,l} \qquad (A\text{-}20)$$

If the objective function were linear in saturation, it would be zero at the following saturation.

$$S_{oi}^{n+1,k+1,m+1} = S_{min} - F_{min} S_{max} - \frac{S_{min}}{F_{max} - F_{min}} \qquad (A\text{-}21)$$

This saturation is used as the next estimate. The fractional flow is computed at this saturation, then the updated objective function, $F_{obj,i}^{m+1}$, is computed using Eq. (A-15). If the objective function's absolute value is small enough (in the examples in the test, less than 0.0001) the iteration is terminated. If not, the bounds are narrowed by the following procedure.

If $F_{obj,i}^{m+1} > 0$, set

If $F_{obj,i}^{m+1} < 0$, set $$S_{\min} = S_{oi}^{n+1,k+1,m+1} \quad \text{(A-22)}$$

$$F_{\min} = F_{obj,i}^{m+1} \quad \text{(A-23)}$$

If $F_{obj,i}^{m+1} > 0$, set $$S_{\max} = S_{oi}^{n+1,k+1,m+1} \quad \text{(A-24)}$$

$$F_{\max} = F_{obj,i}^{m+1} \quad \text{(A-25)}$$

The process beginning with Eq. (A-21) is then repeated until $|F_{obj,i}^{m+1}| \leq 0.0001$. The outer iteration's final saturation, $S_{oi}^{n+1,k+1}$, is set to the final $S_{oi}^{n+1,k+1,m+1}$. This saturation is used to begin the next outer iteration.

A timestep is performed in the following major steps.

1. Initialize the computation by setting $S_{oi}^{n}$ equal to $S_{oi}^{n+1,k+1}$, the final linearized saturation from the preceding timestep.
2. Compute the linear saturation changes, saturations, and fractional flows using the procedure described following Eq. (A-13).
3. Test for convergence based on the linear saturation change. If the largest, in magnitude, linear saturation change is smaller than a pre-specified tolerance, convergence has been obtained. The solution for the timestep is the set of linear saturations from step 2.
4. If convergence has not been obtained, compute improved saturations using the process described beginning with Eq. (A-14).
5. Repeat steps 2 through 4 until convergence is obtained.

Table 1 presents linear saturations and fractional flows for the first outer iteration of the first timestep of a problem with $$\frac{q_w \Delta t}{V_P} = 10$$

and $S_{oi} = 0.9$. Table 2 presents the same linear saturations plus the improved saturations obtained in step 2 immediately above, again for the first iteration of the first timestep. Table 3 presents the same quantities, but for the first four outer iterations of the first timestep.

The Invention as Applied with the SEQ Method

The conventional SEQ method makes gridcell-by-gridcell computations to solve linear equations. At a given gridcell, neighboring gridcell values of the various nonlinear functions (such as fractional flow in the example above) are needed. In the SEQ method in accordance with this invention, flow into and out of a particular gridcell is determined using linearized values of relative permeability and capillary pressure in gridcells neighboring that particular gridcell. Within the gridcell itself, a nonlinear, iterative computation is performed. Flow out of the gridcell is determined based on the results of this iterative calculation. This iteration is similar to that used by the Cascade method. Details of how to perform such iterative computations would be familiar to those skilled in the art.

Consider any gridcell other than the first in the example above. In this simple example calculation, the only neighboring gridcell quantity needed to compute its saturations is the oil fractional flow at the gridcell immediately left of it. Thus, computing saturation at gridcell i consists of solving the problem defined by $$S_{o,i}^{n+1,k+1} = S_{o,i}^{n} + \frac{B_o \Delta t}{V_p}\left(F_{o,i-\frac{1}{2}}^{n+1,k+1,l} - F_{o,i+\frac{1}{2}}^{n+1,k+1}\right) \quad (39)$$

where $$F_{o,i-\frac{1}{2}}^{n+1,k+1,l} = \left[f_{o,i-1}^{n+1,k} + \frac{df_{o,i-1}^{n+1,k}}{dS_{o,i-1}}\left(S_{o,i-1}^{n+1,k+1,l} - S_{o,i-1}^{n+1,k}\right)\right]F_{T,i-\frac{1}{2}} \quad (40)$$

$$F_{o,i+\frac{1}{2}}^{n+1,k+1} = f_{o,i}^{n+1,k+1} F_{T,i+\frac{1}{2}} \quad (41)$$

In equation (39), $$F_{o,i+\frac{1}{2}}^{n+1,k+1}$$

is a function of $f_{o,i}^{n+1,k+1}$, which is a function of $S_{o,i}^{n+1,k+1}$. As a result, equation (39) is solved iteratively. The particular iterative method used is not important, but it is preferably reliable. The iterative method used in this example was the reguli falsi technique. Table 2 shows the result of this computation.

TABLE 2

Saturations Obtained after One Outer iteration when Applying the Invention in the SEQ Method

| Gridcell Number (i) | 1 | 2 | 3 | 4 | 5 | 6 | 7 |
|---|---|---|---|---|---|---|---|
| $S_{o,i}^{1,1,1}$ | −6.2503 | −1.1313 | 0.3229 | 0.7361 | 0.8534 | 0.8868 | 0.8962 |
| $S_{o,i}^{1,1}$ | 0.1976 | 0.5406 | 0.6876 | 0.7945 | 0.8598 | 0.8874 | 0.8964 |

The computed saturations, $S_{o,i}^{1,1}$, look reasonable. However, they are incorrect. During the timestep, 10 gridcell pore volumes of water are injected. As a result, the water saturation change totaled over all gridcells must equal 10, and the total oil saturation change must equal −10. The initial oil saturation is 0.9. For the 7 gridcells shown, the total change from this value for the linearized saturations (in the middle row of the table) is −9.9862, which is nearly −10. For the computed saturations (in the bottom row) the total change is only −1.4361. This is essentially the total change over all gridcells, since only very small saturation changes occur in gridcells that are not shown. The computed oil saturations indicate that far less oil has been displaced than water has been injected which is not realistic.

The newly computed saturations in Table 2 (bottom row) cannot be used as they are since they too are erroneous. An outer iteration procedure, similar to the Newton method described above for the Fully Implicit method, is applied to the SEQ method to obtain more accurate saturation values. Let, for example, $S_{o,i}^{n+1,k}$ be the oil saturation after the $k^{th}$ outer iteration; this is the current estimate of the solution.

Let $S_{o,i}^{n+1,k,l}$ be the linearized oil saturation computed during the $k^{th}$ Newton iteration. Then the computation is $$S_{o,i}^{n+1,k+1} = S_{o,i}^n + \frac{B_o \Delta t}{V_p}\left(F_{o,i-\frac{1}{2}}^{n+1,k+1,l} - F_{o,i+\frac{1}{2}}^{n+1,k+1}\right) \quad (42)$$

where $$F_{o,i-\frac{1}{2}}^{n+1,k+1,l} = f_{o,i-1}^{n+1,k+1,l} F_{T,i-\frac{1}{2}}^{k+1} \quad (43)$$

$$f_{o,i-1}^{n+1,k+1,l} = f_{o,i-1}^{n,k} + \frac{d f_{o,i-1}^{n,k}}{d S_{o,i-1}}\left(S_{o,i-1}^{n+1,k+1,l} - S_{o,i-1}^{n+1,k}\right) \quad (44)$$

$$F_{o,i+\frac{1}{2}}^{n+1,k+1} = f_{o,i}^{n+1,k+1} F_{T,i+\frac{1}{2}}^{k+1} \quad (45)$$

Each Newton iteration can be performed as follows.

1. Compute all nonlinear terms as functions of the current estimate of the solution.
2. Compute pressures.
3. Compute inter-gridcell total flow rates
$$F_{T,i-\frac{1}{2}}^{n+1,k+1}.$$
4. Compute linearized saturations, $S_{o,i}^{n+1,k+1,l}$.
5. Compute updated linearized values of nonlinear terms, $f_{o,i}^{n+1,k+1,l}$.
6. Compute new saturations, $S_{o,i}^{n+1,k+1}$, by iteratively solving equation (42).

This iterative procedure is repeated until convergence is obtained. Its first four of the six steps are identical to those used in the SEQ method when it is applied in iterative fashion.

Table 3 provides results obtained with the iterative SEQ method described above. The procedure converges smoothly and rapidly. After four iterations, the seven gridcells shown have converged to four significant figures. Given that during the timestep ten gridcell pore volumes of water were injected into a system that contained very little water, this is very good performance.

$$S_{o,i}^{n+1,k+1} = S_{o,i}^n + \frac{B_o \Delta t}{V_p}\left(\frac{\lambda_{o,i-1}^{n+1,k+1,l} kA\left(p_{i-1}^{n+1,k+1} - p_i^{n+1,k+1}\right)}{\Delta x} - \frac{\lambda_{o,i}^{n+1,k+1} kA\left(p_i^{n+1,k+1} - p_{i+1}^{n+1,k+1}\right)}{\Delta x}\right) \quad (46)$$

where $$\lambda_{o,i-1}^{n+1,k+1,l} = \lambda_{o,i-1}^{n,k} + \frac{d \lambda_{o,i-1}^{n,k}}{d S_{o,i-1}}\left(S_{o,i-1}^{n+1,k+1,l} - S_{o,i-1}^{n+1,k}\right) \quad (47)$$

Each Newton iteration is performed as follows.

1. Compute all nonlinear terms as functions of the current estimate of the solution.
2. Compute pressures ($p_i^{n+1,k+1}$) and saturations ($S_{o,i}^{n+1,k+1,l}$). The procedure used is that for a conventional fully implicit Newton iteration.
3. Compute updated linearized values of nonlinear terms, $\lambda_{o,i}^{n+1,k+1,l}$.
4. Compute new saturations, $S_{o,i}^{n+1,k+1}$, by iteratively solving equation (46).

This iterative procedure is repeated until convergence is obtained. Its first two steps are identical to those used in the Fully Implicit method.

Figure 7B:
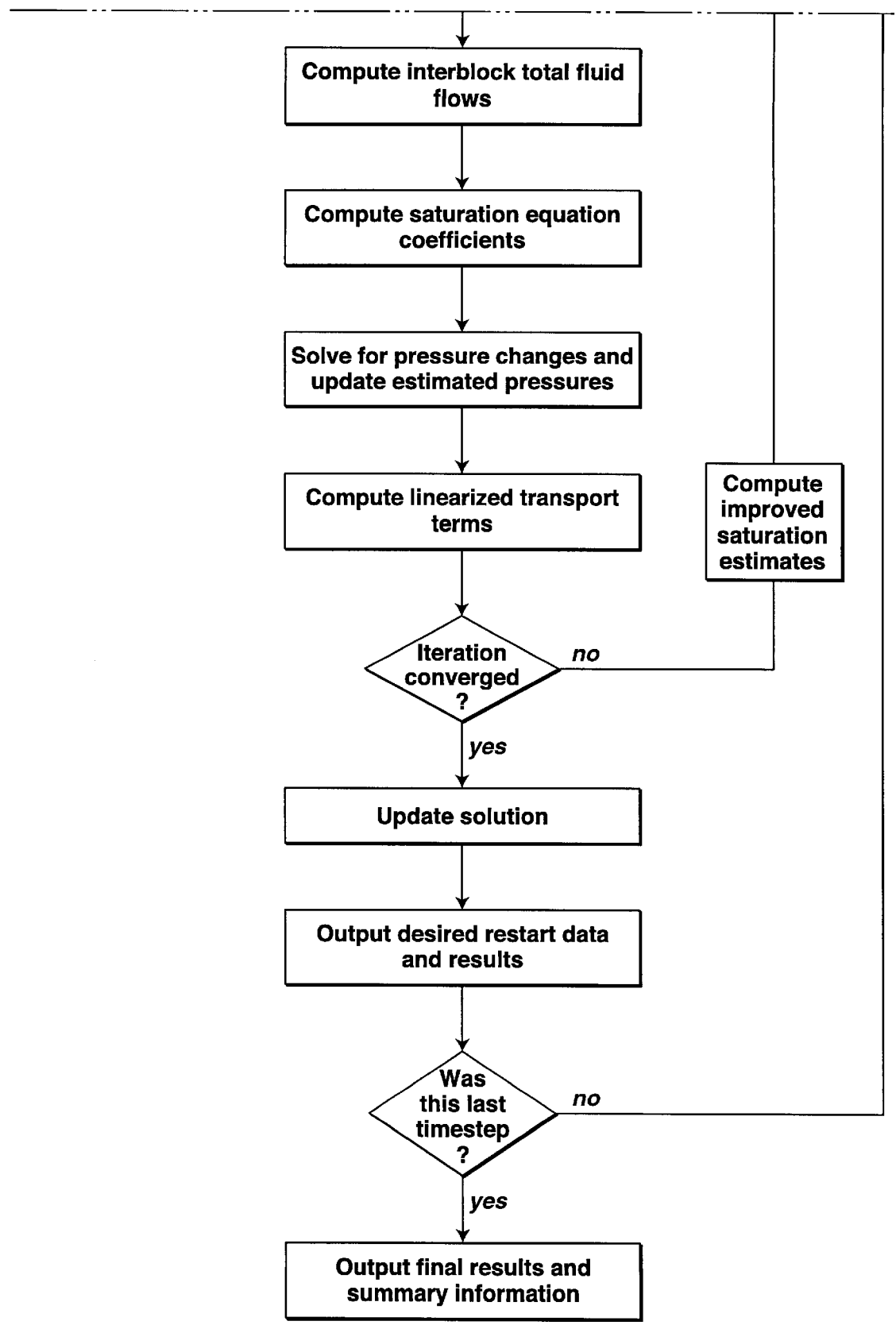
Figure 8B:
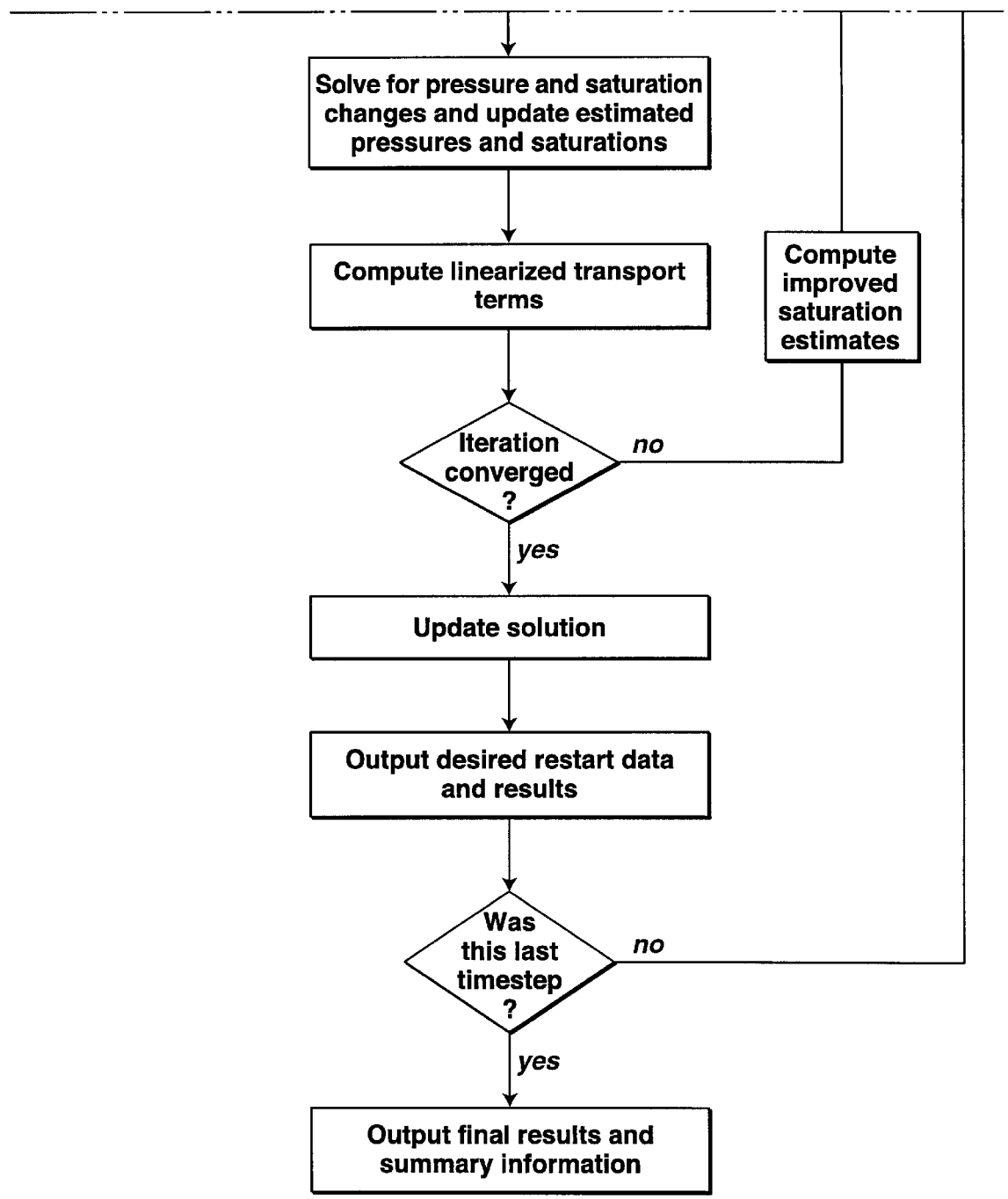

Persons skilled in the art will readily understand that the present invention is computationally intense. Accordingly, use of a computer, preferably a digital computer, to practice the invention is virtually a necessity. Computer software for various portions of the simulation process are commercially available (for example, software is commercially available to develop gridcells, display results, calculate fluid properties, and solve linear sets of equations). Computer software for other portions of the invention could be developed by persons skilled in the art based on the teachings set forth herein. Flow diagrams of a computer program are generally illustrated as FIGS. 7 and 8. FIG. 7 illustrates a generalized flow diagram of the present invention when applied to the SEQ method and FIG. 8 illustrates a gener-

TABLE 3

Invention When Applied with Iterative SEQ Method

| Gridcell Number (i) | 1 | 2 | 3 | 4 | 5 | 6 | 7 |
| --- | --- | --- | --- | --- | --- | --- | --- |
| $S_{o,i}^{1,1,1}$ | −6.2503 | −1.1313 | 0.3229 | 0.7361 | 0.8534 | 0.8868 | 0.8962 |
| $S_{o,i}^{1,1}$ | 0.1976 | 0.5406 | 0.6876 | 0.7945 | 0.8598 | 0.8874 | 0.8964 |
| $S_{o,i}^{1,2,1}$ | 0.1976 | 0.2204 | −0.2728 | −1.3946 | −1.8423 | −0.6745 | 0.3259 |
| $S_{o,i}^{1,2}$ | 0.1976 | 0.2542 | 0.2949 | 0.3509 | 0.4426 | 0.5637 | 0.6857 |
| $S_{o,i}^{1,3,1}$ | 0.1976 | 0.2542 | 0.2930 | 0.3249 | 0.3522 | 0.3147 | 0.0179 |
| $S_{o,i}^{1,3}$ | 0.1976 | 0.2542 | 0.2930 | 0.3238 | 0.3498 | 0.3729 | 0.3964 |
| $S_{o,i}^{1,4,1}$ | 0.1976 | 0.2542 | 0.2930 | 0.3238 | 0.3499 | 0.3730 | 0.3942 |
| $S_{o,i}^{1,4}$ | 0.1976 | 0.2542 | 0.2930 | 0.3238 | 0.3499 | 0.3730 | 0.3942 |

The Invention as Applied with the Fully Implicit Method

The practice of the present invention can also be applied in connection with the Fully Implicit method. Equation (42) is replaced by the following modification of equation (28).

alized flow diagram of the present invention when applied to the Fully Implicit method.

Generalization of the Computation

Define X as the vector of solution variables. In the example used above, $$X = \begin{bmatrix} p \\ S_o \\ S_w \end{bmatrix} \quad (48)$$

In other models, X can include component masses, mole fractions, temperature, energy, and other quantities. In any case, X comprises a set of state variables that is sufficient to define the state of the system. Furthermore, it is the set of solution variables, and other variables are considered to be functions of X, either directly or indirectly.

The flow between gridcells i and i+1 can be written as $$F_{v,i+\frac{1}{2}} = F_{v,i+\frac{1}{2}}(X_i, X_{i+1}) \quad (49)$$

This equation is written for flow between gridcells i and i+1. An equivalent expression can be written for flow between gridcells i and i−1, or in a multidimensional model for flow between gridcell i and any other gridcell with which it is connected.

The linearization of the flow between gridcells i and i+1 can be expressed as $$F_{v,i+\frac{1}{2}}^{n+1,k+1,l} = F_{v,i+\frac{1}{2}}^{n+1,k} + \frac{\partial F_{v,i+\frac{1}{2}}^{n+1,k}}{\partial X_i}(X_i^{n+1,k+1,l} - X_i^{n+1,k}) + \frac{\partial F_{v,i+\frac{1}{2}}^{n+1,k}}{\partial X_{i+1}}(X_{i+1}^{n+1,k+1,l} - X_{i+1}^{n+1,k}) \quad (50)$$

The difference between the iterative SEQ method and the Fully Implicit method is in the definition of F. For either method, F includes the effects of pressure, saturation, capillary pressure, composition, and anything else that affects flow between gridcells and is included in the flow model.

Two new sets of variables can be defined. Let the vector Y consist of the components of X that are used directly in computing flow. The only such component may be pressure. Let the vector Z consist of quantities that are functions of X and are used in computing flow. Relative permeability and capillary pressure are two such quantities.

Using these, we can rewrite equation (49) as $$F_{v,i+\frac{1}{2}} = G_{v,i+\frac{1}{2}}(Y_i, Z_i, Y_{i+1}, Z_{i+1}) \quad (51)$$

and equation (50) as $$F_{v,i+\frac{1}{2}}^{n+1,k+1,l} = G_{v,i+\frac{1}{2}}^{n+1,k} + \frac{\partial G_{v,i+\frac{1}{2}}^{n+1,k}}{\partial Y_i}(Y_i^{n+1,k+1,l} - Y_i^{n+1,k}) + \quad (52)$$
$$\frac{\partial G_{v,i+\frac{1}{2}}^{n+1,k}}{\partial Z_i}(Z_i^{n+1,k+1,l} - Z_i^{n+1,k}) +$$
$$\frac{\partial G_{v,i+\frac{1}{2}}^{n+1,k}}{\partial Y_{i+1}}(Y_{i+1}^{n+1,k+1,l} - Y_{i+1}^{n+1,k}) +$$
$$\frac{\partial G_{v,i+\frac{1}{2}}^{n+1,k}}{\partial Z_{i+1}}(Z_{i+1}^{n+1,k+1,l} - Z_{i+1}^{n+1,k})$$

where the linearized value of $Z_i$ is defined as $$Z_i^{n+1,k+1,l} = Z_i^{n+1,k} + \frac{\partial Z_i^{n+1,k}}{\partial X_i}(X_i^{n+1,k+1,l} - X_i^{n+1,k}) \quad (53)$$

It would be ideal if the linearization of equation (51) could then be written $$F_{v,i+\frac{1}{2}}^{n+1,k+1,l} = G_{v,i+\frac{1}{2}}(Y_i^{n+1,k+1,l}, Z_i^{n+1,k+1,l}, Y_{i+1}^{n+1,k+1,l}, Z_{i+1}^{n+1,k+1,l}) \quad (54)$$

Then the invention would be able to use the expression $$F_{v,i+\frac{1}{2}}^{n+1,k+1} = G_{v,i+\frac{1}{2}}(Y_i^{n+1,k+1}, Z_i^{n+1,k+1}, Y_{i+1}^{n+1,k+1,l}, Z_{i+1}^{n+1,k+1,l}) \quad (55)$$

in the case where the invention is being applied to gridcell i. Unfortunately, equation (55) contains cross-product terms (i.e., terms containing a product such as $(S_{o,i}^{n+1,k+1}-S_{o,i}^{n+1,k})(p_i^{n+1,k+1}-p_i^{n+1,k}))$ that are missing from equation (52). This introduces an consistency problem if equation (55) is applied directly. It is important that consistency be maintained, which means that steps must be taken to ensure that $$F_{v,i+\frac{1}{2}}^{n+1,k+1} = F_{v,i+\frac{1}{2}}^{n+1,k+1,l}$$

when $Y_i^{n+1,k+1} = Y_i^{n+1,k+1,l}$ and $Z_i^{n+1,k+1} = Z_i^{n+1,k+1,l}$. This is accomplished by replacing equation (55) by $$F_{v,i+\frac{1}{2}}^{n+1,k+1} = G_{v,i+\frac{1}{2}}(Y_i^{n+1,k+1}, Z_i^{n+1,k+1}, Y_{i+1}^{n+1,k+1,l}, Z_{i+1}^{n+1,k+1,l}) - E_{v,i+\frac{1}{2}}^{n+1,k+1,l} \quad (56)$$

where $$E_{v,i+\frac{1}{2}}^{n+1,k+1,l}$$

is an error term given by $$E_{v,i+\frac{1}{2}}^{n+1,k+1,l} = \quad (57)$$
$$G_{v,i+\frac{1}{2}}(Y_i^{n+1,k+1,l}, Z_i^{n+1,k+1,l}, Y_{i+1}^{n+1,k+1,l}, Z_{i+1}^{n+1,k+1,l}) - F_{v,i+\frac{1}{2}}^{n+1,k+1,l}$$

and $$F_{v,i+\frac{1}{2}}^{n+1,k+1,l}$$

is computed using equation (52). The error term can be evaluated based on the linearized values, all of which are known when the invention is applied.

During application of the invention to gridcell i, equation (56) is used regardless of whether gridcell i or i+1 is upstream. If i+1 is upstream for all phases and there is no capillary pressure, flow between i and i+1 depends only on the linearized values at i+1. If i is upstream, the same flow depends only on the new values being computed at i. In either case, the computation is the same as it was in the examples discussed above. If there is countercurrent flow, equation (56) appropriately uses a mixture of linearized i+1 values and new i values. Similarly, if capillary pressure effects are introduced, equation (56) uses the appropriate values from the two gridcells.

It is expected that the process of the present invention will play an important role in lowering the cost of production of oil and gas resources. The economical and efficient production of reserves is crucial to prolonging the world's oil and gas resources. It is believed that the present invention can make a significant contribution to that effort.

The invention is not to be unduly limited to the foregoing which has been set forth for illustrative purposes. On the contrary, a wide variety of modifications and alternative embodiments will be apparent to persons skilled in the art without departing from the true scope to the invention as defined in the claims set forth below.

Symbols Table

The most commonly used symbols in this description of the invention are defined as follows:

A=cross sectional area between two gridcells
$B_o$=oil formation volume factor (reservoir volume of the oil phase per standard volume of oil)
$B_w$=water formation volume factor
E=error in computed flow between gridcells defined by equation (55)
$f_o$=fraction of total mobility that is oil mobility
$f_w$=fraction of total mobility that is water mobility
$F_o$=rate of flow of oil
$F_w$=rate of flow of water
$F_T$=rate of flow of oil plus water
G=generalized functional form of flow between gridcells
i=subscript denoting gridcell
k=permeability; as a superscript denotes iteration
k=ro=relative permeability of oil
$k_{rw}$=relative permeability of water
l=superscript indicating linearized value
m=superscript denoting inner iteration number
n=superscript denoting time level; n=0,1,2,3 . . .
p=pressure
$q_o$=oil flow rate
$q_w$=water flow rate
$S_o^n$=oil saturation at current time
$S_w^n$=water saturation at current time
$S_o^{n+1}$=oil saturation at new time
$S_w^{n+1}$=water saturation at new time
T=subscript indicating total
$T_o$=gridcell pore volume divided into the sum of oil in a gridcell at the beginning of a timestep and the linearized amount of oil flowing in during the timestep.
$\Delta t$=change of time
$\mu_o$=oil viscosity
$\mu_w$=water viscosity
$V_p$=gridcell pore volume
$\Delta x$=distance between centers of two gridcells
x=distance
X=vector of solution variables; see equation (48)
Y=vector containing the components of X that are used directly in computing flow between gridcells
Z=vector containing quantities that are functions of X and are used in computing flow between gridcells
$\lambda_o$=mobility of oil (oil relative permeability divided by oil viscosity)
$\lambda_w$=mobility of water (water relative permeability divided by water viscosity)
$\delta$=operator denoting change over an iteration
$\Delta$=operator denoting change in space or time
$\nu$=subscript denoting an arbitrary phase

I claim:

1. A computer-implemented process for predicting a time-varying property of at least one fluid in a fluid-containing physical system, comprising the steps of:

(a) equating the physical system to a volumetric grid system comprising a plurality of gridcells;

(b) for each gridcell, constructing nonlinear governing equations representative of the behavior of the fluids in the gridcell over a time interval, said equations using fluid and transport properties computed at the end of the time interval;

(c) determining linear expressions for nonlinear fluid and transport properties in the governing equations and using these linear expressions to derive linear equations over the time interval;

(d) solving the linear equations to determine an estimated solution at the end of the time interval;

(e) determining linear estimates of the nonlinear fluid and transport properties at the end of the time interval by evaluating the linear expressions for the fluid and transport properties at the estimated solution;

(f) determining an improved solution by performing iterative gridcell-by-gridcell computations wherein fluid flows to and from a particular gridcell determined using (i) fluid and transport properties for that particular gridcell evaluated at the improved solution at that particular gridcell and (ii) the linear estimates of fluid and transport properties at one or more gridcells adjacent to the particular gridcell;

(g) using the results of step (f) to predict a property of at least one fluid in the physical system at the end of the time interval; and (h) performing steps (b) through (g) for a plurality of time intervals and using the results to predict a time-varying property of at least one fluid in the physical system.

2. The process of claim 1 wherein the physical system is a subterranean formation.

3. The process of claim 2 wherein the subterranean formation contains hydrocarbon fluids.

4. The process of claim 1 wherein the physical system comprises fluid-containing facilities associated with production of hydrocarbons from a subterranean hydrocarbon-bearing formation.

5. The process of claim 4 wherein the fluid-containing facilities are surface flow lines and wellbore tubing.

6. The process of claim 1 wherein the results of step (f) are used to predict the saturation of a fluid in the physical system.

7. The process of claim 1 further comprising after step (f) and before step (g) repeating the iterative computations of steps (c) through (f) to satisfy a predetermined convergence criterion.

8. The process of claim 1 wherein the gridcells are finite difference gridcells and the governing equations are finite difference equations.

9. The process of claim 8 wherein the gridcells are unstructured.

10. The process of claim 8 wherein the gridcells are structured.

11. The process of claim 1 wherein the gridcells are finite elements and the governing equations are finite element equations.

12. The process of claim 1 wherein the gridcells are finite volumes and the governing equations are finite volume equations.

13. The process of claim 1 wherein the step (f) is applied only to gridcells in which significant changes in fluid properties occur during a timestep.

14. A computer-implemented process for predicting a time-varying property of at least one fluid in a subterranean formation comprising, (a) equating said formation to a volumetric grid system comprising a plurality of gridcells;

(b) for each gridcell, constructing nonlinear finite difference equations representative of the behavior of the fluids in each gridcell over a time interval, said equations using fluid and transport properties computed at the end of the time interval;

(c) determining linear expressions for nonlinear fluid and transport properties in the governing equations and using these linear expressions to derive linear equations over the time interval;

(d) solving the linear equations to determine an estimated solution at the end of the time interval;

(e) determining linear estimates of the nonlinear fluid and transport properties at the end of the time interval by evaluating the linear expressions for the fluid and transport properties at the estimated solution;

(f) determining an improved solution by performing iterative gridcell-by-gridcell computations wherein fluid flows to and from a particular gridcell are determined using (i) fluid and transport properties for that particular gridcell evaluated at the improved solution at that particular gridcell and (ii) the linear estimates of fluid and transport properties at one or more gridcells adjacent to the particular gridcell;

(g) repeating the iterative computations of steps (c) through (f) to satisfy predetermined convergence criteria;

(h) using the results of step (g) to predict a property of at least one fluid in the formation at the end of the time interval; and (i) performing steps (b) through (h) for a plurality of time intervals and using the results to predict a time-varying property of at least one fluid in the formation.

15. The process of claim 14 wherein the step (f) is applied only to gridcells in which significant changes in fluid properties occur during a time interval.

16. A computer-implemented process for predicting a time-varying property of at least one fluid in a fluid-containing subterranean formation comprising, (a) equating said formation to a volumetric grid system comprising a plurality of gridcells;

(b) for each gridcell, constructing nonlinear finite difference equations representative of rock and fluid properties in each gridcell for each fluid, said fluid properties being represented as implicit in time;

(c) linearizing the nonlinear terms in the finite difference equations to derive the linear equations used in the sequential implicit method which will include linear pressure equations and linear saturation equations;

(d) solving the linear pressure equations to determine an estimated pressure solution;

(e) computing total flow rates between gridcells;

(f) using the results of step (e) to modify the linear saturation equations;

(g) solving the linear saturation equations to determine an estimated saturation solution;

(h) improving the estimated saturation solution by performing iterative gridcell-by-gridcell computations wherein flows to and from a certain gridcell are determined by linearized values of nonlinear terms in gridcells adjacent the certain gridcell and new timestep values of these nonlinear terms for the certain gridcell;

(i) computing phase flow rates between gridcells based on the results of step (g);

(j) computing the amount of each fluid in each gridcell using the results of step (i);

(k) repeating the iterative computations of steps (c) through (j) to satisfy predetermined convergence criteria;

(l) using the results of step (k) to predict a property of at least one fluid in the formation at the current time; and (m) performing steps (a) through (l) for a plurality of timesteps and using the results to predict a time-varying property of at least one fluid in the formation.

17. The process of claim 16 wherein the step (h) is applied only to gridcells in which significant changes in fluid properties occur during a timestep.

* * * * *

UNITED STATES PATENT AND TRADEMARK OFFICE
CERTIFICATE OF CORRECTION

PATENT NO.   : 6,052,520
DATED        : April 18, 2000
INVENTOR(S)  : James W. Watts, III.

It is certified that error appears in the above-identified patent and that said Letters Patent is hereby corrected as shown below:

Column 5,
Line 57, please delete "fill" and insert -- full -- therefor.

Column 22,
Formula A-21, please delete " $S_{oi}^{n+1,m+1} = S_{min} - F_{min} S_{max} - \dfrac{S_{min}}{F_{max} - F_{min}}$ "

and insert -- $S_{oi}^{n+1,m+1} = S_{min} - F_{min} \dfrac{S_{max} - S_{min}}{F_{max} - F_{min}}$ --

Column 23,
Line 1, please delete " $F_{obj,i}^{m+1} > 0,$ set" and insert -- $F_{obj,i}^{m+1} < 0,$ set -- therefor.

Column 28,
Line 21, please delete " $\left(S_{o,i}^{n+1,k+1} - S_{o,i}^{n+1,k}\right)\left(p_i^{n+1,k+1} - p_i^{n+1,k}\right)$ that are missing from equation"

and insert -- $\left(S_{o,i}^{n+1,k+1} - S_{o,i}^{n+1,k}\right)\left(p_i^{n+1,k+1} - p_i^{n+1,k}\right)$ that are missing from equation -- therefor.

Signed and Sealed this

Twentieth Day of August, 2002

*Attest:*

*Attesting Officer*

JAMES E. ROGAN
*Director of the United States Patent and Trademark Office*